(12) United States Patent
Huang et al.

(10) Patent No.: US 8,811,514 B2
(45) Date of Patent: Aug. 19, 2014

(54) PARTIAL INTERFERENCE ALIGNMENT FOR K-USER MIMO INTERFERENCE CHANNELS

(75) Inventors: Huang Huang, Hong Kong (CN); Vincent Kin Nang Lau, Hong Kong (CN)

(73) Assignee: Dynamic Invention LLC, Mahe (SC)

( * ) Notice: Subject to any disclaimer, the term of this patent is extended or adjusted under 35 U.S.C. 154(b) by 232 days.

(21) Appl. No.: 13/277,981

(22) Filed: Oct. 20, 2011

(65) Prior Publication Data

US 2012/0281780 A1 Nov. 8, 2012

Related U.S. Application Data

(60) Provisional application No. 61/483,527, filed on May 6, 2011.

(51) Int. Cl.
*H04B 7/02* (2006.01)

(52) U.S. Cl.
USPC ........... 375/267; 375/296; 375/285; 455/500; 455/517

(58) Field of Classification Search
USPC .................................. 375/267, 347, 285, 296
See application file for complete search history.

(56) References Cited

U.S. PATENT DOCUMENTS

| 2010/0227635 | A1 | 9/2010 | Kim et al. | |
|---|---|---|---|---|
| 2010/0265813 | A1 | 10/2010 | Pereira et al. | |
| 2012/0040706 | A1* | 2/2012 | Shin et al. | 455/517 |
| 2012/0250780 | A1* | 10/2012 | Shen et al. | 375/285 |
| 2012/0307929 | A1* | 12/2012 | Seo et al. | 375/267 |

FOREIGN PATENT DOCUMENTS

CN 102025665 4/2011

OTHER PUBLICATIONS

Han, et al., "A new achievable rate region for the interference channel," IEEE Trans. Inf. Theory, vol. 27, pp. 49-60, Jan. 1981.
Etkin, et al., "Gaussian Interference Channel Capacity to Within One Bit," IEEE Trans. Inf. Theory, vol. 54, pp. 5534-5562, Dec. 2008, 52 pages.
Cadambe, et al., "Interference alignment and degrees of freedom of the K-user interference channel," IEEE Trans. Inf. Theory, vol. 54, pp. 3425-3441, Aug. 2008, 30 pages.
Nazer, et al., "Ergodic interference alignment," in Proc. ISIT, Jun.-Jul. 2009, 23 pages.

(Continued)

*Primary Examiner* — Eva Puente
(74) *Attorney, Agent, or Firm* — Amin, Turocy & Watson, LLP

(57) ABSTRACT

Systems, methods, and apparatus are described that employ a partial interference alignment scheme in conjunction with an interference detection scheme to mitigate interference in quasi-static multiple input multiple output (MIMO) channels. In an aspect, sets of transmitter and receiver pairs are determined based on feasibility of alignment of the transmitters at the receivers of the sets in accordance with an interference alignment scheme and path loss associated with signal transmissions between the transmitter and receiver pairs, wherein the sets include different alignment assignments of the respective transmitters at the respective receivers of the sets. The alignment assignments can include different numbers of the transmitters aligned at the receivers of the sets. A set is then selected from the sets that contributes to an interference profile at the receivers that facilitates interference detection at the receivers. Interference detection at a receiver is further simplified using semi-definite relaxation techniques.

39 Claims, 21 Drawing Sheets

(56) References Cited

OTHER PUBLICATIONS

Gomadam, et al., "Approaching the capacity of wireless networks through distributed interference alignment," 2008. Available: http://arxiv.org/abs/0803.3816, 10 pages.
Peters, et al., "Interference alignment via alternating minimization," in IEEE Proc. ICASSP' 09, Apr. 2009.
Yetis, et al., "Feasibility Conditions for Interference Alignment," 2009. Available: http://arxiv.org/abs/0904.4526, 6 pages.
Weingarten, et al., "The capacity region of the Gaussian multiple-input multiple-output broadcast channel," IEEE Trans. Inf. Theory, vol. 52, pp. 3936-3964, Sep. 2006.
Cover, et al., "Elements of Information Theory (Second Edition)." John Wiley & Sons, Inc., 2006.
Bresler, et al., "The approximate capacity of the many-to-one and one-to-many Gaussian interference channels," 2009. Available: http://arxiv.org/abs/0809.3554, 45 pages.
Sridharan, et al., "Capacity of symmetric K-user Gaussian very strong interference channels," 2008. Available: http://arxiv.org/abs/0808.2314.
Sridharan, et al., "A layered lattice coding scheme for a class of three user gaussian," 2008. Available: http://arxiv.org/pdf/0809.4316, 8 pages.
Motahari, et al., "Real Interference Alignment: Exploiting the Potential of Single Antenna Systems," 2009. Available: http://arxiv.org/abs/0908.2282.
Ghasemi, et al., "Interference alignment for the K user MIMO interference channel," 2009. Available: http://arxiv.org/abs/0909.4604, 25 pages.
Ma, et al., "Quasi-maximum-likelihood multiuser detection using semi-definite relaxation with application to synchronous CDMA," IEEE Trans. Signal Process., vol. 50, pp. 912-922, Apr. 2002.
Ma, et al., "Semidefinite relaxation based multiuser detection for M-ary PSK multiuser systems," IEEE Trans. Signal Process., vol. 52, pp. 2862-2872, Oct. 2004, 11 pages.
Wiesel, et al., "Semidefinite relaxation for detection of 16-QAM signaling in MIMO channels," IEEE Signal Process. Lett., vol. 12, pp. 653-656, Sep. 2005.
Jalden, et al., "Reducing the average complexity of ML detection using semidefinite relaxation," in IEEE Proc. ICASSP' 09, Mar. 2005.
Tresch, et al., "On the achievability of interference alignment in the K-user constant MIMO interference channel," in IEEE/SP 15th Workshop on Statistical Signal Processing, Aug.-Sep. 2009, 4 pages.
Papadimitriou, et al., "Combinatorial Optimization : Algorithms and Complexity." Mineola, N.Y. :Dover Edition, 1998.
Nemhauser, et al., "Integer and Combinatorial Optimization." New York: Wiley, 1988.
Simon, et al., "Digital Communication over Fading Channels (2nd Edition)." Hoboken, N.J. : John Wiley & Sons,, 2005. http://books.google.com/books?hl=en&lr=&id=bi3KsW__COSsC&oi=fnd&pg=PR25&dq=Simon+Digital+Communication+over+Fading+Channels+&ots=fPsFvsX8-u&sig=nv0YUrMbjJweZ8lasUwbWXVTW_0#v=onepage&q=Simon%20Digital%20Communication%20over%20Fading%20Channels&f=false.
Proakis, "Digital Communications (Fourth Edition)." Boston : McGraw-Hill, 2001.
Boyd, et al., "Convex Optimization." Cambridge, U.K.: Cambridge University Press, 2004, 730 pages.
Recommendation ITU-R M.1225, "Guidelines for evaluation of radio transmission technologies for IMT-2000," 1997, 65 pages.
International Search Report for PCT Application No. PCT/CN2012/000606 mailed Aug. 16, 2012, 2 pages.

\* cited by examiner

Aligned Transmitters at each Receiver (α = 2)

4 – Users Interference Channels (a Biparite Graph)

PARTIAL INTERFERENCE ALIGNMENT FOR K-USER MIMO INTERFERENCE CHANNELS

This application claims priority to U.S. Provisional Patent Application Ser. No. 61/483,527, filed on May 6, 2011, entitled "PARTIAL INTERFERENCE ALIGNMENT FOR K-USER MIMO INTERFERENCE CHANNELS." The entirety of the aforementioned application is incorporated by reference herein.

TECHNICAL FIELD

This disclosure relates generally to wireless communications in connection with a multiple input multiple output systems, including mitigating interference.

BACKGROUND

Interference is a difficult problem in wireless communications. For instance, the capacity region of two-user Gaussian interference channels has been an open problem for over thirty years. Recently, there has been some progress in understanding interference and extensive studies have been done regarding interference alignment (IA) techniques. IA was proposed in M. A. Maddah-Ali, A. S. Motahari, and A. K. Khandani, "Signaling over MIMO multi-base systems-combination of multi-access and broadcast schemes," in Proc. of IEEE ISIT, Page(s) 2104-2108, 2006., and M. A. Maddah-Ali, A. S. Motahari, and A. K. Khandani, "Communication over MIMO X channels: Interference alignment, decomposition, and performance analysis," IEEE Trans. on Information Theory, Vol. 54, no. 8, Page(s) 3457-3470, August 2008, to reduce the effect of multi-user interference. IA was extended to deal with K pairs interference channels in Cadambe, V. R.; Jafar, S. A.; Shamai, S.; "Interference alignment and degrees of freedom of the K-user interference channel," IEEE Trans. on Information Theory Vol. 54, No. 8, August 2008.

IA reduces the dimension of the aggregated interference by aligning interference from different transmitters into a lower dimension subspace at each receiver. Using infinite dimension extension on the time dimension (time selective fading), it has been shown that the IA can achieve the optimal Degrees-of-Freedom (DoF) of $$\frac{KN}{2}$$

in K-pair multiple input multiple output (MIMO) ergodic interference channels with N antennas at each node.

One important challenge of IA schemes is the feasibility condition. For instance, the IA schemes in Cadambe require $O((KN)^{2K^2N^2})$ dimensions of signal space to achieve the $$\frac{KN}{2}$$

total DoF. To avoid such huge dimensions of signal space, some researchers have studied IA designs for quasi-static (or constant) MIMO interference channels. With limited signal space dimensions, the achievable DoF of each transmitter-receiver pair in MIMO interference channels is upper bounded by $$\frac{N_t + N_r}{K+1}$$

(where K is the number of transmitter-receiver pairs, $N_t$, $N_r$ are the number of antennas at each transmitter and receiver, respectively). Unlike the time-selective or frequency-selective MIMO interference channels, total DoF of quasi-static MIMO interference channels do not scale with K.

Furthermore, for quasi-static MIMO channels, conventional IA might be infeasible depending on the system parameters. For example, it is conjectured in C. M. Yetis, T. Gou, S. A. Jafar, and A. H. Kayran, "On feasibility of interference alignment in MIMO interference networks," IEE Trans. Signal Process., vol. 58, pp. 4771-4782, September 2010, that conventional IA on quasi-static MIMO (M transmit and N receive antennas) interference channels is not feasible to achieve a per user DoF greater than $$\frac{M+N}{K+1}.$$

As a result, IA alone is insufficient to eliminate all interference in quasi-static MIMO interference channels especially when K is large. For example, due to the fact that not all the interferers can be aligned at each receiver when K is large, there will be residual interference at the receiver.

The above-described deficiencies of conventional IA techniques are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies of conventional interference management techniques and other drawbacks of current interference management technologies, various systems, methods, and apparatus described employ partial interference alignment in based on interference detection at receiving devices. For example, a device is described having an identification component configured to identify sets of transmitter and receiver pairs based on feasibility of alignment of the transmitters at the receivers of the sets in accordance with an interference alignment scheme and path loss associated with signal transmissions between the transmitter and receiver pairs, wherein the sets include different alignment assignments of respective transmitters at respective receivers of the sets. In an aspect, the alignment assignments include different numbers of the transmitters aligned at the receivers of the sets. The device can further comprise an optimization component configured to select a set from the sets that contributes to an interference profile at the receivers that facilitates interference detection at the receivers.

According to another example, transmitting device is provided comprising antennas configured to transmit signals in subspaces through a quasi-static multiple input multiple output channel to receiving devices, and a precoder configured to precode the signals with a beamforming vector to facilitate alignment of interference associated with a transmitting device at a subset of the receiving devices, wherein the subset of the receiving devices is determined based on a feasibility of the alignment and path loss associated with signal transmissions between the transmitting device and the subset of the receiving devices. In an aspect, the subset of the receiving devices is determined based on interference profiles at the receiving devices that facilitate interference detection at the receiving devices, wherein the interference profiles are created in response to performance of the alignment.

In another embodiment, a receiving device is provided comprising antennas configured to receive signals in subspaces through a quasi-static multiple input multiple output channel from transmitting devices, wherein a portion of the signals include interference signals associated with a subset of the transmitting devices, and a decoder configured to decode the interference signals with a zero-forcing vector associated with an interference alignment scheme to facilitate cancelling interference from the subset of the transmitting devices, wherein the subset of the transmitting devices is determined based on feasibility of alignment of the subset of the transmitting devices at the receiving device in accordance with the interference alignment scheme and path loss associated with received the signals. In an aspect, the subset of the transmitting devices is determined based on an interference profile at the receiving device that facilitates interference detection by the receiving device, wherein the interference profile is created in response to the performance of the interference alignment scheme.

Still, provided is a method, comprising determining sets of transmitter and receiver pairs based on feasibility of alignment of the transmitters at the receivers of the sets in accordance with an interference alignment scheme and path loss associated with signal transmissions between the transmitter and receiver pairs, wherein the sets include different alignment assignments of the respective transmitters at the respective receivers of the sets. In an aspect, the alignment assignments include different numbers of the transmitters aligned at the receivers of the sets.

In another example, a method is provided comprising transmitting signals from a transmitting device in subspaces through a quasi-static multiple input multiple output channel to receiving devices, and precoding the signals with a beamforming vector that facilitates alignment of interference associated with the transmitting device at a subset of the receiving devices, wherein the subset of the receiving devices is determined based on a feasibility of the alignment and path loss associated with signal transmissions between the transmitting device and the subset of receiving devices. In an aspect, the subset of the receiving devices is determined based on interference profiles at the receiving devices that facilitate interference detection at the receiving devices, wherein the interference profiles are created in response to performing the alignment.

Further, provided is a method comprising receiving signals at a receiving device in subspaces through a quasi-static multiple input multiple output channel from transmitting devices, receiving aligned signals at the receiving device from a subset of the transmitting devices in accordance with an interference alignment scheme, and decoding the aligned signals with a zero-forcing vector that facilitates cancelling interference associated with the subset of the transmitting devices, wherein the subset of the transmitting devices is determined based on the feasibility of the interference alignment scheme and path loss associated with received signals.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
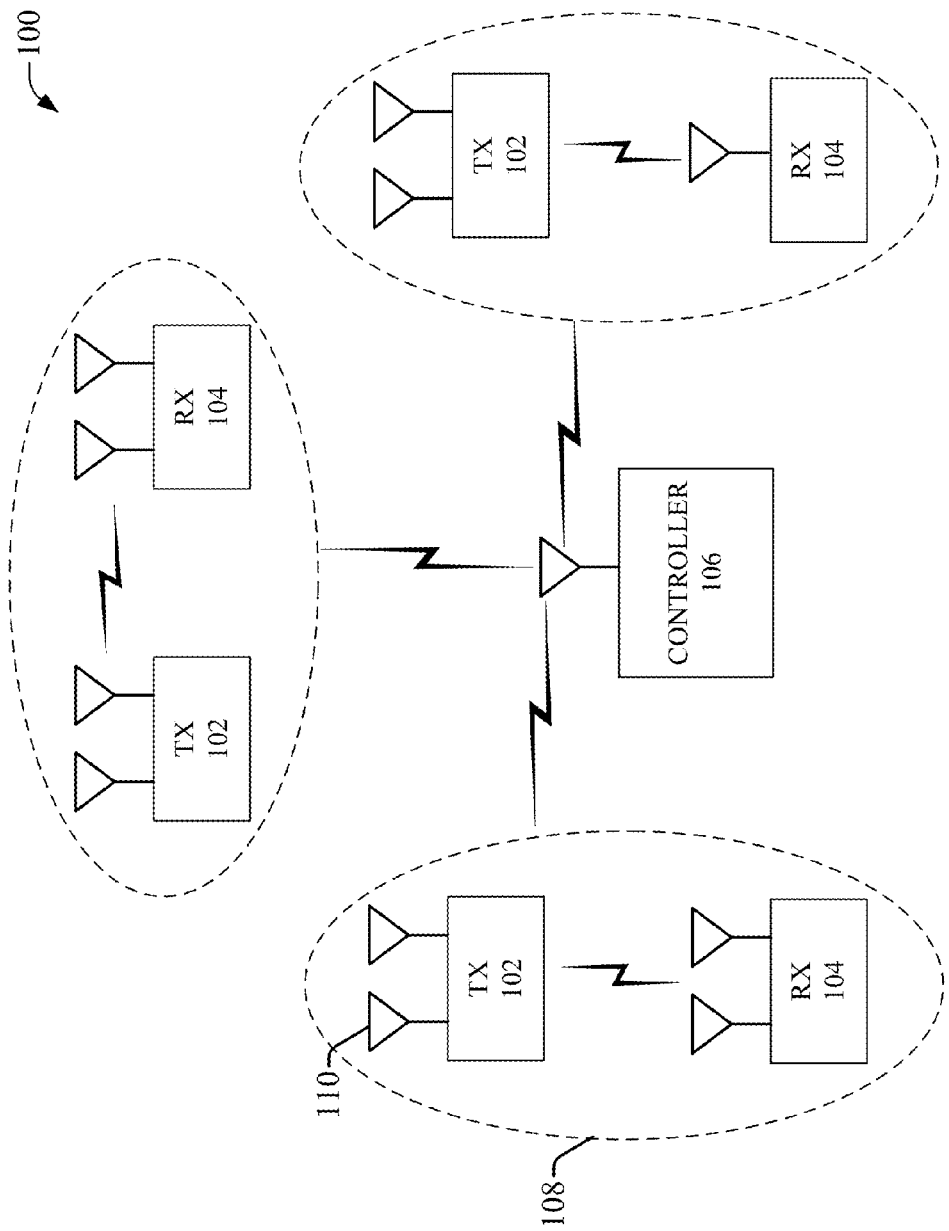
FIG. 1 illustrates a distributed wireless network 100, in accordance an some embodiments.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

FIG. 1 illustrates a distributed wireless network 100 in accordance with some embodiments. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described.

In an aspect, wireless network 100 is a multiple input multiple output (MIMO) network. The distributed wireless network illustrated in FIG. 1 includes a plurality of transmitters (Tx) 102, a plurality of receivers (Rx) 104 and a central controller 106. Transmitters 102 and receivers 104 may form transmitter-receiver pairs 108 that communicate directly with each other in accordance with a MIMO communications techniques. Transmitters 102 and receivers 104 may represent any type of wireless communication device which may have both transmit and receive capabilities. The controller 106 may be a stand-alone wireless communication device configured to communicate wirelessly with transmitters 102 and receivers 104, or may be located within one of transmitters 102 or receivers 104. For, example, the transmitters and receiver can include base stations, access point, and/or user devices. The term node as used herein is used to refer to any apparatus which functions as a transmitter or receiver.

Although FIG. 1 depicts three transmitter (Tx) and receiver (Rx) pairs, it should be appreciated that any number of transmitter and receiver pairs can operate in network 100 in accordance with the subject disclosure. As user herein, the network 100 constitutes a MIMO system with K transmitter (Tx) and receiver (Rx) pairs. Each transmitter and each receiver has $M_t$ and $N_r$ antennas 110, respectively. In an aspect, the transmitters and receiver are randomly distributed in a defined area, for example a 2 km×1 km rectangular area. Tx and Rx pairs are configured to communicate via quasi-static MIMO interference channels. MIMO interference channels are generally defined by channel state matrices including a number of coefficients. The term quasi-static as used herein indicates that the interference channels are substantially constant. In other words, the channel coefficients generally are unchanging. In an aspect, quasi-static MIMO interference channels do not consider symbol extensions.

According to an embodiment, Tx and Rx pairs are configured to communicate via fully connected MIMO interference channels. The term "fully-connected" refers to the condition that all channel coefficients are non-zero. In other words, all receivers see interference from all transmitters. Fully connected interference channels have full rank channel state matrices. According to another embodiment, Tx and Rx pairs are configured to communicate via partially connected MIMO interference channels. For example, MIMO interference channels can be partially connected due to path loss, shadowing, as well as patial correlation. Partially connected MIMO interference channels have some channel coefficeints are zero, and thus the channel is not full rank.

Figure 2:
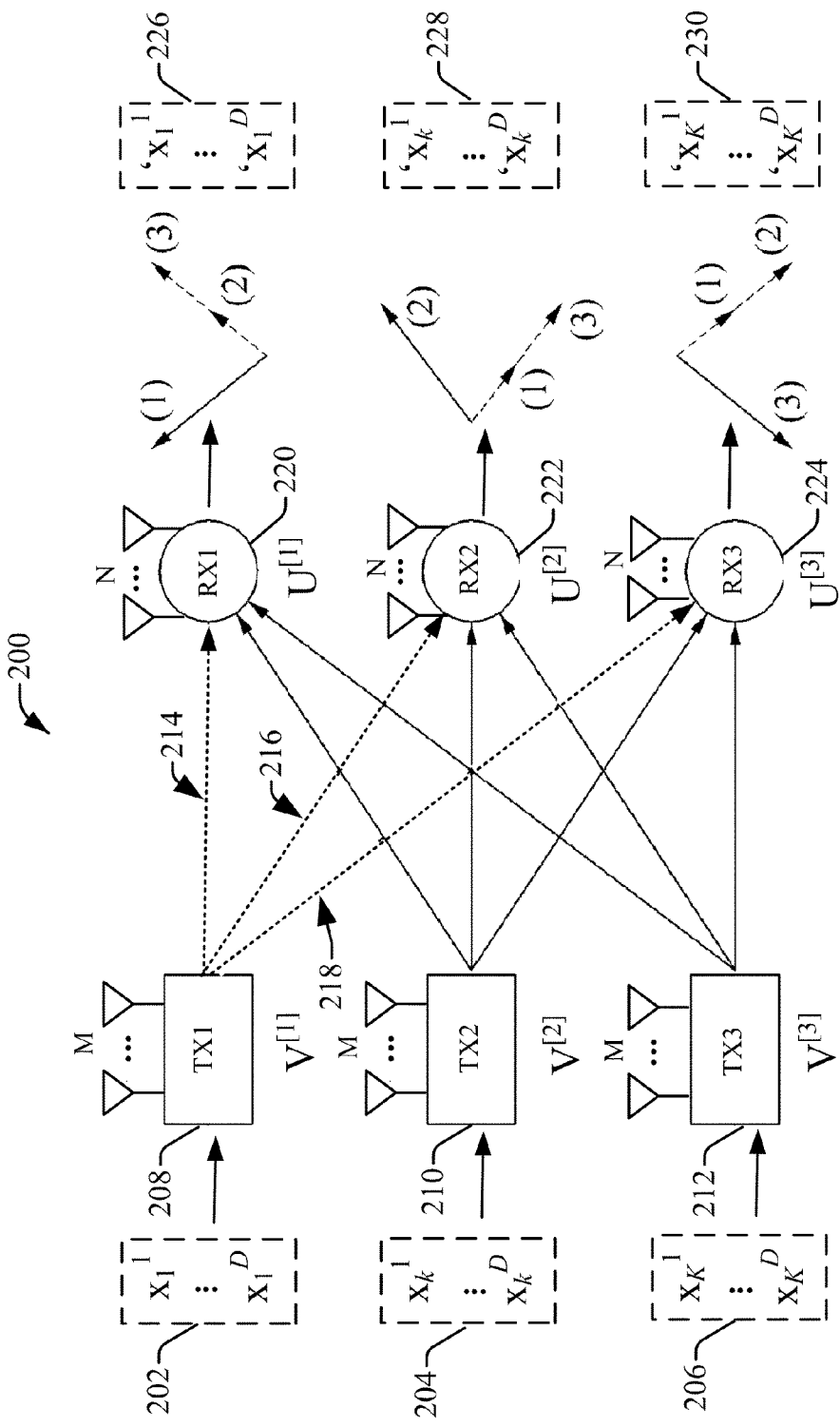
FIG. 2 illustrates a system with K-user quasi-static MIMO Gaussian interference channels in accordance with and embodiment.

FIG. 2 illustrates a model system 200 operable in accordance with embodiments. System 200 depicts transmitters and receivers capable of communicating via K-user quasi-static MIMO Gaussian interference channels. As seen in FIG. 2, each transmitter Tx1, Tx2, and Tx3, 208-212 respectively, has M-antennas for communicating D independent data streams to a corresponding N-antennas of associated receivers Rx1, Rx2, and Rx3, 220-224 respectively. In FIG. 2, for example, K-pair interference channel $H_{mn}$, between Tx1 and Rx1 is denoted by 214, K-pair interference channel $H_{mn}$, between Tx1 and Rx2 is denoted by 216, and K-pair interference channels $H_{mn}$, between Tx1 and Rx3 is denoted by 218. According to an embodiment, the transmitters Tx1, Tx2, and Tx3, 208-212 respectively, transmit data streams 202-206 respectively, as discrete constellation inputs. In an aspect, the data streams are quadrature phase-shift keying (QPSK) constellations. In another aspect, the data streams are quadrature amplitude modulation (QAM) constellations. The channel output at the k-th receive node is described as follows:

$$y_k = \sum_{i \in \mathcal{K}} \sqrt{P_i L_{ki}} H_{ki} \bar{x}_i + z_k, \quad \text{(Eq. 1)}$$

where $\mathcal{K} = \{1, \ldots, K\}$, $H_{ki} \in \mathbb{C}^{N \times M}$ is the MIMO complex fading coefficients from the i-th transmitter to the k-th receiver, $L_{ki}$ is the long term path gain from the i-th transmitter to the k-th receiver, and $P_i$ is the average transmit power of the i-th transmitter. In (1), $\bar{x}_i \in \mathbb{C}^{M \times 1}$ is the complex signal vector transmitted by transmit node i, and $z_k \in \mathbb{C}^{N \times 1}$ is the circularly symmetric Additive White Gaussian Noise (AWGN) vector at receive node k. All noise terms are independent and identically distributed (i.i.d) zero mean complex Gaussian with $\mathbb{E}[z_k(z_k)^H] = 2I_N$.

According to an embodiment, that the long term path gain is given by $L_{ki} = \omega d_{ki}^{-\gamma}$, where $d_{ki}$ is the distance between transmit node i and receive node k, $\omega$ is the Log-normal shadow fading with a standard deviation $\sigma_\omega$, and $\gamma$ is the path loss exponent. The entries of $H_{ki}$ for all k, i are i.i.d. complex Gaussian random variables given by $[H_{ki}]_{(n,m)}: \mathcal{CN}(0,1)$ for all k, i, n, m, where $[H_{ki}]_{(n,m)}$ denotes the $(n,m)^{th}$ element of $H_{ki}$. In addition, the i-th transmit node transmits D≤min(M, N) independent QPSK data streams $\{x_i^1, \ldots, x_i^D\}$ to the i-th receive node where $$x_i^d \in \mathcal{S} = \left\{ \frac{\sqrt{2}}{2}(1+j), \frac{\sqrt{2}}{2}(1-j), \frac{\sqrt{2}}{2}(-1+j), \frac{\sqrt{2}}{2}(-1-j) \right\},$$

$$\forall d \in \{1, \ldots, D\}.$$

In an aspect, $v_i^d(\|v_i^d\|=1$, where $\|\cdot\|$ denotes the Frobenius norm), denote the precoder for the $x_i^d$ symbol. Accordingly, the transmitted vector at the i-th transmitter is given by $\bar{x}_i = \sum_d v_i^d x_i^d$.

In an embodiment, transmitters Tx1, Tx2, Tx3 and receivers Rx1, Rx2, and Rx3 are configured to mitigate interference via and interference alignment (IA) technique. For instance, IA is a signal processing approach attempts to simultaneously align the interference on a lower dimension subspace at each receiver so that the desired signals can be transmitted on the interference-free dimensions. As used herein, IA refers to signal space alignment approach techniques. For example, referring to FIG. 2, a MIMO communication system 200 includes transmission nodes (Tx1, Tx2, and Tx3) 208, 210, and 212. Each of the transmission nodes (Tx1, Tx2, and Tx3) 208, 210, and 212 corresponds to each of destination receiver nodes (Rx1, Rx2, and Rx3) 220, 222, and 224 respectively. It should be appreciated that three transmitters and receivers are depicted for ease of explanation. Additional K transmitter (Tx) and receiver (Rx) pairs can be employed. Each of the transmission nodes (Tx1, Tx2, and Tx3) 208, 210, and 212 denotes a data transmission device that includes, for example, a fixed base station, a mobile base station, a miniature base station such as a femto base station, a relay station, and the like. Each of the receiver nodes (Rx1, Rx2, and Rx3) 220, 222, and 224 denotes a data reception device that includes, for example, a relay station, a fixed terminal, a mobile terminal, and the like.

When each of the transmission nodes (Tx1, Tx2, and Tx3) 208, 210, and 212 transmits data using the same MIMO channel, interference may occur in each of the receiver nodes (Rx1, Rx2, and Rx3) 220, 222, and 224. For example, in receiver node (Rx1) 220, a signal of the transmission node (Rx1) 208 corresponds to a desired signal and signals of the transmission nodes (Tx2, Tx3) 210 and 212 correspond to interference. Similarly, interference may occur even in the receiver nodes (Rx2, Rx3) 222 and 224. The above described interference may decrease a throughput of the communication system. The decrease in the throughput caused by the interference may be prevented or reduced by using an interference alignment scheme. For example, the transmission nodes (TxI, Tx2, and Tx3) 208, 210, and 212 may adjust a phase of a signal reasonably designed precoders V[1], V[2], and V[3], respectively. (As used herein, the term beamforming matrix, beamforming filter, precoder, precoding matrix, and precoding filter, are used interchangeably). A signal of each of the transmission nodes (TxI, Tx2, and Tx3) 208, 210, and 212 with the adjusted phase may be transmitted via MIMO channels. A received signal of each of the receiver nodes (Rx1, Rx2, Rx3) 220, 222 and 224 may be separated into a desired signal and unwanted interference. For example, presume that arrow indicators (1), (2), and (3) of FIG. 2 denote a desire signal of the receiver nodes (Rx1, Rx2, Rx3) 208, 210 and 212 respectively. A received signal of the receiver node (Rx1) 220 may be separated into a desired signal (1) of the receiver node (Rx1) 220, and interference (2) and (3). A received signal of the receiver node (Rx2) 222 may be separated into a desired signal (2) of the receiver node (Rx2) 222, and interference (1) and (3). A received signal of the receiver node (Rx3) 224 may be separated into a desired signal (3) of the receiver node (Rx3) 224, and interference (1) and (2).

The receiver nodes (Rx1, Rx2, Rx3) 220, 222 and 224 may cancel or reduce the interference in the received signal to extract the desired signal using reasonably designed decorrelator U[1], U[2], and U[3], respectively. (As used herein, the terms decoding matrix, decoding filter, equalizer, and zero-forcing matrix/filter, are used interchangeably). For example, the transmission nodes (TxI, Tx2, and Tx3) 208, 210, and 212 may use the reasonably designed beamforming matrices V[1], V[2], and V[3], respectively. The receiver nodes (Rx1, Rx2, Rx3) 220, 222 and 224 may use the reasonably designed decoding matrices U[1], U[2], and U[3], respectively. Through use of these matrices, it is possible to enhance the efficiency of the use of radio retransmissions and to prevent or reduce a decrease in throughput of the communication system caused by interference.

Although an expression of the precoding matrices V[1], V[2], and V[3] and the decoding matrices U[1], U[2], and U[3] is used here for ease of description, the precoding matrices V[1], V[2], and V[3] and the decoding matrices U[1], U[2], and U[3] may be in a matrix or a vector form. For example, the precoding matrices V[1], V[2], and V[3] and the decoding matrices U[1], U[2], and U[3] may have the form of a matrix or a vector according to a number of data streams of each of the transmission nodes (TxI, Tx2, and Tx3) 208, 210, and 212.

However, for quasi-static (or constant) channels, conventional IA, such as the general interference alignment scheme above, may be infeasible depending on system parameters. For example, it is conjectured that conventional IA on quasi-static MIMO (M transmit and N receive antennas) interference channels is not feasible to achieve a per user degrees of freedom (DoF) greater than $$\frac{M+N}{K+1}.$$

As a result, IA alone cannot eliminate all interference in quasi-static MIMO interference channels especially when K is large.

Due to the fact that not all the interferers can be aligned at each receiver in the above noted interference alignment scheme with a large K, there will be residual interference at the receiver. In an aspect, the receivers of the systems disclosed herein have interference detection (ID) capabilities (discussed infra). Accordingly, in aspects, the receivers can detect and cancel the residual interference based on the constellation map derived from the discrete constellation inputs.

Figure 3:
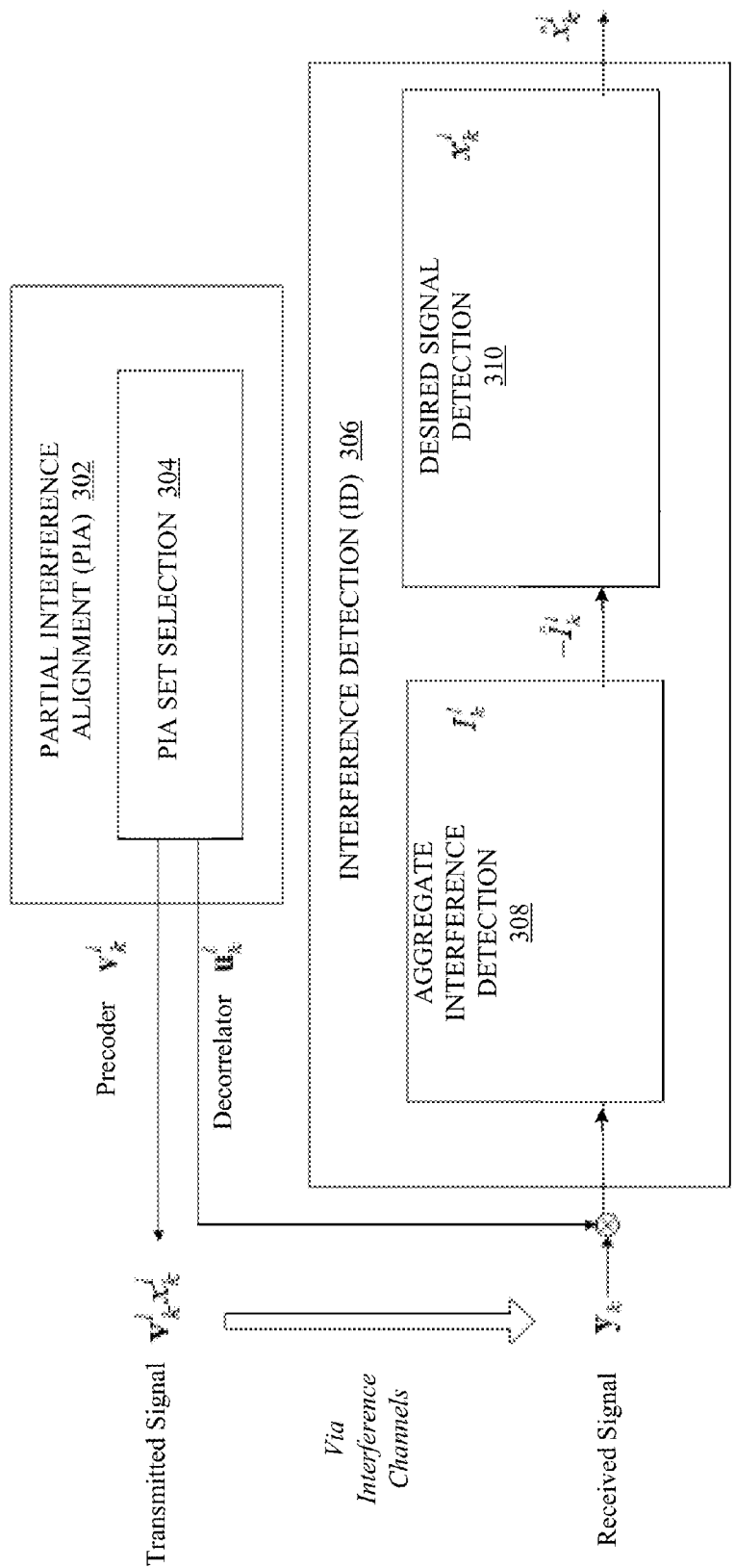
FIG. 3 presents a high level block diagram of a partial interference alignment scheme with interference detection (PIAID), in accordance with an embodiment.

Referring now to FIG. 3, presented is a high level block diagram of a system 300 configured to employ partial interference alignment and interference detection (PIAID) for K-user quasi-static MIMO interference channels with discrete constellation inputs. PIAID centers on the realization that IA and ID are complementary approaches to deal with interference in quasi-static MIMO interference channels. In PIAID, the IA approach is first used to eliminate some interference and the ID approach is used to deal with the residual interference at each receiver. As seen in FIG. 3, block 302 represents the PIA aspect of PIAID and block 306 represents the ID aspect of PIAID.

With reference to 302, in an aspect partial interference alignment (PIA) is motivated by the feasibility issue of the MIMO interference alignment without symbol extension. For instance, it is conjectured that only when $$K \le \frac{M+N}{D} - 1,$$

the K−1 interfering transmitters can be aligned at every receiver node. As a result, constant MIMO interference channels not all the K−1 interfering transmitters can be aligned at every receiver node for large K. Furthermore, existing IA schemes do not consider or exploit the effects of different path losses between transmit and receive pairs. For instance, nodes with large path loss may not need to be interference-aligned and hence, it is important to jointly consider the feasibility issue and the path loss effects. When path loss effects are taken into consideration, not all transmitters will contribute the same effect at the receiver.

Figure 4B:
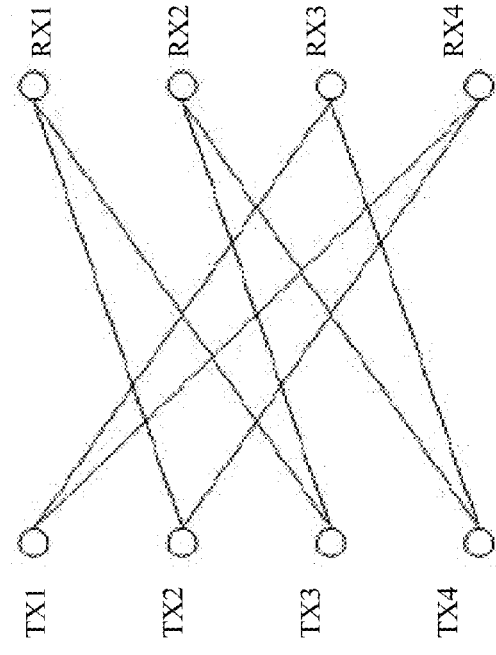
FIG. 4B illustrates and example of four user interference channels post-IA in accordance with an embodiment. presents a high level block diagram of various system elements operable in MIMO systems such as systems in accordance PIAID.
Figure 4A:
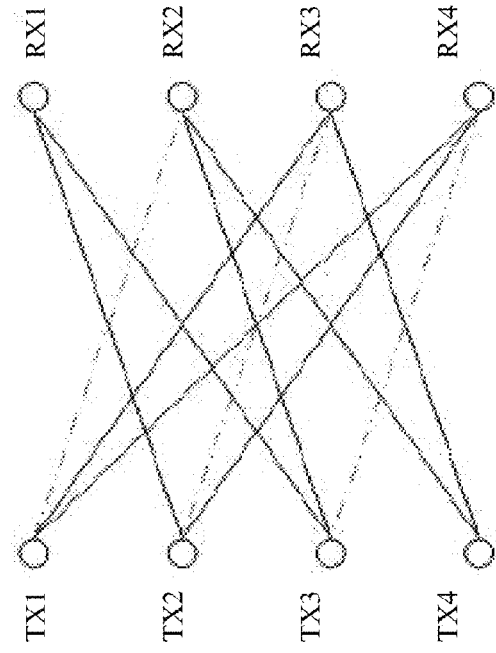
FIG. 4A illustrates an example of four user interference channels pre-IA in accordance with an embodiment.

FIG. 4A and FIG. 4B illustrates an example of four user interference channels where M=N=2 and D=1. FIGS. 4A and 4B demonstrate an example of how the feasibility condition of MIMO IA and path loss effect IA. FIG. 4A illustrates the four user interference channels pre-IA and FIG. 4B illustrates the four user interference channels post-IA. Using the feasibility condition of MIMO IA defined above, only two transmitters can be aligned at each receiver. Specifically, the four user interference channels are represented by a bipartite graph $\mathcal{B} = (\mathcal{R}, \mathcal{T}, \mathcal{E})$, where $\mathcal{R} = \{r_1, \ldots, r_4\}$ is the set of the receive nodes, $\mathcal{T} = \{t_1, \ldots, t_4\}$ is the set of the transmit nodes, and $\mathcal{E} = \{[r_k, t_i], \forall k, i \text{ and } k \ne i\}$ is the set of the edges. Path costs depend on path gains and transmit power. Path costs are represented by the dashed and solid lines. When adding path costs to the feasibility condition, it becomes clear that obvious that TX2 and TX3 should be aligned at RX1 as indicated in the FIG. 4B. In FIG. 4B path cost represented by the dashed lines is eliminated.

Referring back to FIG. 3, motivated by the example above, PIA 302 provides priority in determining which nodes should be aligned given the feasibility constraint and the path loss effects. In addition, the performance of ID at the receiver depends heavily on the interference profile. In particular, there is a window of unfavorable interference profile for ID at the receivers. For instance, ID at the receiver is more effective when the interference is stronger than the desired signal. Thus, according to another aspect, PIA contributes to creating a more desirable interference profile for ID by careful selecting a subset of users for IA.

In overview, PIA determines a set (hereinafter referred to a PIA set) 304 of transmitters that can be aligned at each receiver node k based on the feasibility condition and path loss information to create a favorable interference profile at each receiver for ID processing. Interference alignment is then applied only to the members of the PIA set. In an aspect, described infra, PIA derives the average symbol error rate (SER) by taking into account the non-Guassian residual interference due to discrete constellation. PIA employs a low complexity user set selection algorithm for the PIAID scheme, which minimizes the asymptotically tight bound for the average end-to-end SER performance.

As noted above, at 302 according to an aspect, PIA is employed to dynamically select α transmitters to be aligned at each receiver node based on the path costs. The index of the aligned transmitters at each receiver is given by a PIA set with cardinality α. Specifically, a PIA set is defined as $\mathcal{A} = \{\mathcal{A}_k, \forall k\}$, where $\mathcal{A}_k = \{k_1, k_2, \ldots, k_\alpha \neq k\}$ denotes the index of aligned transmitters at the receiver k for some constant α. Only the transmit nodes that belong to $\mathcal{A}_k$ will align their transmit signals by choosing precoders and decorrelators according to the traditional IA requirement. In particular, the transmit nodes that belong to $\mathcal{A}_k$ will align their transmit signals by choosing precoders and decorrelators satisfying $rank((U_k)^\dagger H_{kk} V_k) = D, \forall k$.

By applying the traditional IA feasibility requirements to $\mathcal{A}_k$, we have the following:

$$(U_k)^\dagger H_{ki} V_i = 0, \forall i \in \mathcal{A}_k$$

$$(U_k)^\dagger H_{kk} V_k = \text{diag}(\lambda_1, \ldots, \lambda_D), \forall k \quad \text{(Eq. 2)}$$

where $(\cdot)^\dagger$ denotes the Hermitian transpose, $\text{diag}(\lambda_1, \ldots, \lambda_D)$ denotes a diagonal matrix with diagonal entries $\lambda_1, \ldots, \lambda_D$, $U_k = [u_k^1, \ldots, u_k^D]$ are the N×D decorrelators at receiver k with $\|u_k^l\| = 1, \forall l$, and $V_i = [v_i^1, \ldots, v_i^D]$ are the M×D precoders at transmitter i with $\|v_i^l\| = 1, \forall l$.

As described in C. M. Yetis, T Gou, S. A. Jafar, and A. H Kayran. "On feasibility of Interference alignment in MIMO networks," *IEE Trans. Inf. Theory*, vol. 56, pp 4566-4592, September 2010, the entirety of which is incorporated herein by reference, the total number of equations for the IA requirement $\{(U_k)^\dagger H_{ki} V_i = 0, \forall i \in \mathcal{A}_k, \forall k\}$ is $N_e = \Sigma_k |\mathcal{A}_k| D^2 = \alpha K D^2$, and the total number of variables is $N_v = \Sigma_k D(M+N-2D) = KD$ (M+N-2D). When each transmitter is selected by α receivers, the feasibility condition is simply given by $N_e \leq N_v$, i.e.

$$\alpha(\mathcal{A}) \leq \min\left(\frac{M+N}{D} - 2, K - 1\right).$$

In view of the above, a sufficient condition for a feasible PIA set $\mathcal{A}$ is given by:

$$\alpha(\mathcal{A}) \leq \min\left(\frac{M+N}{D} - 2, K - 1\right) \text{ and} \quad \text{(Eq. 3)}$$

$$\sum_k 1(i \in \mathcal{A}_k) = \alpha(\mathcal{A}), \forall i$$

where $1(\cdot)$ is the indicator function, $\alpha(\mathcal{A}) = |\mathcal{A}_k|$ is the cardinality of $\mathcal{A}_k$ (i.e., the number of aligned interferers at each receiver). The requirement as per Eq. 3 means that each transmitter should be selected by $\alpha(\mathcal{A})$ receivers. The PIA set $\mathcal{A}$ is a design parameter in the proposed PIA scheme, and how to choose the PIA set is presented infra with respect to FIG. 7. While the feasibility condition embodied in Eq. 3 restricts the choice of the feasible set $\mathcal{A}$, it introduces graph structure for the optimization with respect to $\mathcal{A}$. Furthermore, the proposed PIA algorithm under Eq. 3 has similar performance as the solution obtained by brute-force exhaustive search Eq. 3 restrictions.

The interference detection (ID) aspect of PIAID is performed at 306. ID is performed at the receiving nodes. As noted above, PIA accounts for the case where not all the K−1 interferers can be aligned at each receiver. As a result, there can be residual interference at every receiver. In an embodiment, linear processing is adopted at the receiver and the detection process for l-th data stream at the k-th receiver is divided into two stages, namely the aggregate interference detection stage at 308 and the desired signal detection stage at 313. First the aggregate interference signal is estimated by using the constellation maps derived from the QPSK inputs, 308. Then at 310, the desired signal is detected after subtracting the estimated aggregate interference. For instance, the normalized received signal at the k-th receiver is given by:

$$y_k = \sqrt{P_k L_{kk}} H_{kk} v_k^l x_k^l + \underbrace{\sum_{d \neq l} \sqrt{P_k L_{kk}} H_{kk} v_k^d x_k^d}_{\text{inter-stream interference}} + \quad \text{(Eq. 4)}$$

$$\underbrace{\sum_{i \notin \mathcal{A}_k; d} \sqrt{P_i L_{ki}} H_{ki} v_i^d x_i^d}_{\text{non-aligned interferers}} + \underbrace{\sum_{i \in \mathcal{A}_k; d} \sqrt{P_i L_{ki}} H_{ki} v_i^d x_i^d}_{\text{aligned interferers}} + z_k.$$

With reference to stage I processing at 308, using the l-th column of $U_k$ in Eq. 2, $u_k^l$, as the decorrelator, the post-processed signal of the l-th stream is given by:

$$y_k^l = (u_k^l)^\dagger y_k \quad \text{(Eq. 5)}$$

$$= \sqrt{P_k L_{kk}} H_{kk}^{ll} x_k^l + \underbrace{\sum_{i \notin \mathcal{A}_k; d} \sqrt{P_i L_{ki}} H_{ki}^{ld} x_i^d}_{\text{non-aligned interferers}} + (u_k^l)^\dagger z_k,$$

where $H_{ki}^{ld} = (u_k^l)^\dagger H_{ki} v_i^d$ is the equivalent channel gain for the d-th data stream of transmitter i at receiver k. In an aspect, the inter-stream interference and the interference contributed by users in the IA set $\mathcal{A}_k$ is completely eliminated due to the PIA requirement in Eq. 2.

According to an embodiment, the stage I processing estimates the aggregate strong interference. In particular, ID at the receiver is more effective when the interference is stronger than the desired signal. Mathematically, $\mathcal{Q}_k = \{i: P_i L_{ki} \geq P_k L_{kk}, \forall i \notin \mathcal{A}_k, i \neq k\} \subseteq \{1, \ldots, K\}$ denotes the set of strong residual interference. The first stage processing estimates the aggregate strong interference $I_k^l = \Sigma_{i \in \mathcal{Q}_k; d} \sqrt{P_i L_{ki}} H_{ki}^{ld} x_i^d$ using a nearest neighbor detection rule. For example, based on the decorrelator output, $y_k^l$, the detected aggregate strong interference $\hat{I}_k^l$ is given by:

$$(\hat{I}_k^l)^* = \arg\min_{c \in \mathcal{I}_k^l} |y_k^l - c|, \quad \text{(Eq. 6)}$$

where $\mathcal{I}_k^l = \{\Sigma_{i \in \mathcal{Q}_k; d} \sqrt{P_i L_{ki}} H_{ki}^{ld} s_i^d : s_i^d \in \mathcal{S}\}$ is the set of possible values the strong interference from $\mathcal{Q}_k$ can take. In an aspect, when $\mathcal{Q}_k = \emptyset$, there will be no stage I decoding for the desired data stream $x_k^l$.

With reference to stage II processing at 310, the desired signal is detected. In particular, estimated aggregate strong interference $(\hat{I}_k^l)^*$ is first subtracted from the decorrelator output $y_k^l$ as illustrated:

$$\tilde{y}_k^l = y_k^l - \text{black}(\hat{I}_k^l)^* \quad \text{(Eq. 7)}$$
$$= \sqrt{P_k L_{kk}} H_{kk}^{ll} x_k^l + I_k^l - (\hat{I}_k^l)^* + \underbrace{\sum_{i \in O_k; d} \sqrt{P_i L_{ki}} H_{ki}^{ld} x_i^d}_{residual\,interference} +$$
$$(u_k^l)^\dagger z_k,$$

Where $O_k = \{i: P_i L_{ki} < P_k L_{kk}, \forall i \notin \mathcal{A}_k, i \neq k\} \subseteq \{1, \ldots, K\}$ denotes the set of weak residual interference, and obviously we have $O_k \cup Q_k \cup \mathcal{A}_k \cup \{k\} = \mathcal{K}$. In turn, the desired signal for receiver k is detected based on $\tilde{y}_k^l$ using the following stage II minimum-distance algorithm. The l-th data symbol at the k-th receiver $x_k^l$ is detected based on $\tilde{y}_k^l$ according to the minimum-distance rule given by:

$$\Re\{(\hat{x}_k^l)^*\} = \begin{cases} \dfrac{\sqrt{2}}{2} & \text{if } \Re\left\{\dfrac{\tilde{y}_k^l}{\sqrt{P_k L_{kk}} H_{kk}^{ll}}\right\} \geq 0 \\ -\dfrac{\sqrt{2}}{2} & \text{else} \end{cases} \quad \text{(Eq. 8)}$$

$$\Im\{(\hat{x}_k^l)^*\} = \begin{cases} \dfrac{\sqrt{2}}{2} & \text{if } \Im\left\{\dfrac{\tilde{y}_k^l}{\sqrt{P_k L_{kk}} H_{kk}^{ll}}\right\} \geq 0 \\ -\dfrac{\sqrt{2}}{2} & \text{else} \end{cases}$$

Figure 5:
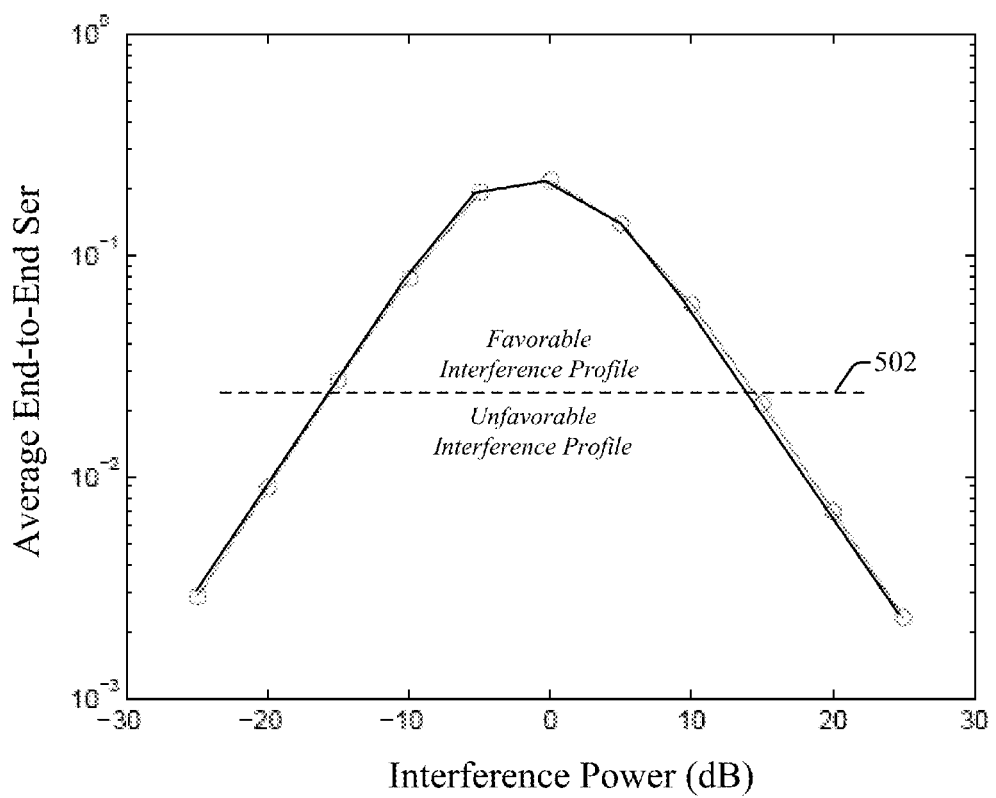
FIG. 5 illustrates a graphical representation of the average end-to-end SER performance of the ID detector versus the interference power in accordance with an embodiment.

FIG. 5 illustrates the average end-to-end SER performance of the ID detector versus the interference power. Specifically, the input to the ID detector is given by $y = H_1 x_1 + \sqrt{P_2} H_2 x_2$, where $x_1 \in \mathcal{S}$ is the desired signal, $x_2 \in \mathcal{S}$ is the interference, $H_1, H_2 : \mathcal{CN}(0,1)$, and the interference power is $P_2$. The average end-to-end SER is given by $\overline{SER}(P_2) @ \Sigma_{x_1} \Pr\{\hat{x}_1 \neq x_1 | x_1, P_2\}$. The performance of ID processing depends heavily on the interference profile, which contains the relative power of the residual interference at the receiver. When looking at FIG. 5, there is a window of unfavorable interference power for which the performance of the ID is poor. For example, as indicated by the dashed line 502, the interference profile above the dashed line is favorable and the interference profile below the dashed line is unfavorable. The user selection of the PIA stage can contribute significantly to the end-to-end SER performance of the PIAID scheme. The user set selection $\mathcal{A}$ of PIAID does not aim at removing the strongest interference. On the contrary, it remove the unfavorable interference characterized by the ID stage requirement. In other words, user set selection aims to create the most favorable interference profile at the receivers. As a result, the PIA and ID processing are complementary approaches to combat interference and their designs are tightly coupled together.

Is should be appreciated that dashed line 502 is merely drawn in place by example and is not fixed. For instance, dashed line 502 merely indicates that an unfavorable interference profile is found when interference power is at the high end or low end. In an aspect the low end includes interference from about −28 dB to about −20 db. In another aspect, the low end includes interference from about −28 dB to about −15 dB. In yet another aspect, the low end includes interference from about −28 dB to about −10 dB. Still, in yet another aspect, the low end includes interference from about −28 dB to about −5 dB. In addition, in an aspect the high end includes interference from about 20 dB to about 28 dB. In another aspect, the high end includes interference from about 15 dB to about 28 dB. In yet another aspect, the low end includes interference from about 10 dB to about 28 dB. Still, in yet another aspect, the low end includes interference from about 5 dB to about 28 dB.

PIA sets contributing to a favorable interference profile are indicated above the dashed line 502. Again, it should be appreciated that dashed line 502 is merely drawn in place by example and is not fixed. For instance, dashed line 502 merely indicates that a favorable interference profile is found where interference power is not at the high end or the low end of interference power, i.e strong interference and weak interference respectively. A favorable interference profile has medium strength interference power. For example, in an apsect, a favorable interference profile has interference from about −15 dB to about 15 dB. In another aspect, a favorable interference profile has interference from about −10 dB to about 10 dB. Still in yet another aspect, a favorable interference profile has interference from about −5 dB to about 5 dB.

Figure 6:
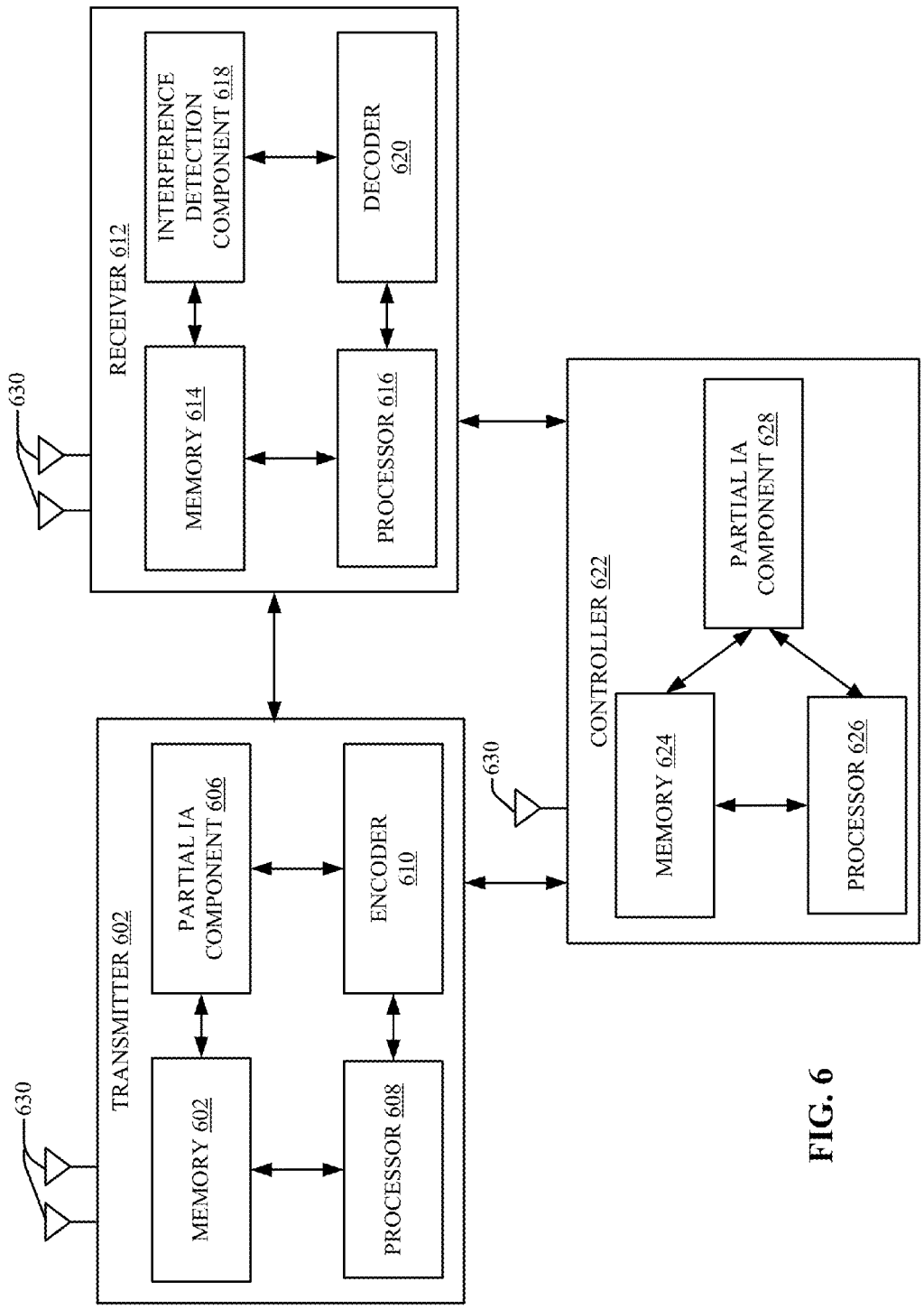
FIG. 6 presents a high level block diagram of various system elements operable in MIMO systems such as system 100 or 200 in accordance with an embodiment.

Turning now to FIG. 6, presented are high level block diagrams of various system elements operable in MIMO systems described herein. The various system elements include a transmitter 602, a receiver 612 and a central controller 622. In an aspect, transmitter 602 and receiver 612 constitute network nodes. In distributed network embodiments, transmitter 602 may be suitable for use as one or more of transmitters 102 (FIG. 1), receiver 612 may be suitable for use as one or more of receivers 104 (FIG. 1) and the central scheduler 622 may be suitable for use as central controller 106 (FIG. 1). Transmitter 602, receiver 612, and central controller can include mobile computing devices, or fixed computing devices capable of communicating in a MIMO network. For example, in an aspect, transmitter 602 and receiver 612 can include mobile user devices, access points, and/or base stations. Controller 622 can include a media access controller (MAC), or any type of remote controller or management platform capable of providing addressing and channel access control mechanisms that make it possible for network nodes, such as transmitter 602 and receiver 622, to communicate within a MIMO network. In another aspect, controller 622 can reside within a transmitter 602 or a receiver 622.

As seen in FIG. 6, transmitter can include a memory 602, a processor 608, a partial interference alignment (PIA) component 606, an encoder 610, and two or more antennas 630 for performing MIMO signaling protocol. Memory 604 holds instructions for carrying out the operations of the PIA component 606 and the encoder 610, when executed by processor 608. The processor facilitates controlling and processing all onboard operations and functions of the transmitter. Memory 604 interfaces to the processor 608 for storage of data and one or more applications of the transmitter. The applications can be stored in the memory 604 and/or in a firmware, and executed by the processor 608 from either or both the memory 604 or/and the firmware (not shown).

Receiver 612 can include a memory 614, a processor 616, an interference detection (ID) component 618, a decoder 620, and two or more antennas 630 for performing MIMO signaling protocol. Memory 614 holds instructions for carrying out the operations of the ID component 618 and the decoder 620, when executed by processor 608. The processor facilitates controlling and processing all onboard operations and functions of the receiver 612. Memory 614 interfaces to the processor 616 for storage of data and one or more applications of the transmitter. The applications can be stored in the memory 614 and/or in a firmware, and executed by the processor 616 from either or both the memory 614 or/and the firmware (not shown).

Controller 622 can include a memory 624, a processor 626, and a PIA component 628 and two or more antennas 630 for performing MIMO signaling protocol. Memory 624 holds instructions for carrying out the operations of the PIA component 628 when executed by processor 628. The processor facilitates controlling and processing all onboard operations and functions of the controller. Memory 624 interfaces to the processor 626 for storage of data and one or more applications of the transmitter. The applications can be stored in the memory 624 and/or in a firmware, and executed by the processor 626 from either or both the memory 624 or/and the firmware (not shown).

In some embodiments, the central controller 622 is configured to employ PIA component 628 in order to dynamically determine a PIA set in accordance with the subject PIAID scheme. In particular, the controller 622 is configured to identify sets of transmitter and receiver pairs based on feasibility of aligning the transmitters at the receivers of the sets in accordance with an interference alignment scheme and path loss associated with signal transmissions between the transmitter and receiver pairs, wherein the sets include different alignment assignments of the respective transmitters at the respective receivers of the sets. (PIA set determination is discussed in greater depth infra with respect to FIG. 7). Once the controller has determined a PIA set, the controller is configured to direct the transmitter and receiver pairs to perform an interference alignment technique that involves signal space alignment. In an aspect the controller 622 is configured to determine the precoders and decorrelators for the transmitter and receiver pairs included in the PIA set. In an aspect, the precoders and decorrelators are determined via traditional interference alignment techniques. In another aspect the precoders and decorrelators are determined in accordance with alternative interference mitigation schemes. The precoders are designed to maximize the overlap of interference signal subspaces at each receiver while ensuring that the desired signal vectors at each receiver are linearly independent of the interference subspace. Therefore, each receiver can zero-force all the interference signals without zero-forcing any of the desired signals.

In an aspect, the central controller 622 communicates the determined precoders and decorrelators for the transmitters and receivers of the PIA set to the transmitters and receivers of the PIA set respectively. In response to being instructed by the central controller 622, the transmitters 602 of each transmitter-receiver pair are configured to precode baseband signals with the determined precoder filter. The associated receiver of each transmitter-receiver pair is further configured to apply the determined decorrelator filter.

Transmitter 602 includes encoder 610 in order to precode signals with the precoders for transmission to an associated receiver, such as receiver 612, of a transmitter-receiver pair. Receiver 612 includes decoder 620 to apply the decorrelator and decode the precoded signals received from the transmitter 602 of a transmitter-receiver pair. The decoder is configured to apply the decorrelator in order to enable the receiver to zero-force all the interference signals without zero-forcing any of the desired signals.

In another embodiment, the transmitter is configured to employ PIA component 606 in order to dynamically determine a PIA set in accordance with the subject PIAID scheme. In particular, the transmitter 602 can identify sets of transmitter and receiver pairs based on feasibility of aligning the transmitters at the receivers (including the transmitter determining the sets itself) of the sets in accordance with an interference alignment scheme and path loss associated with signal transmissions between the transmitter and receiver pairs, wherein the sets include different alignment assignments of the respective transmitters at the respective receivers of the sets. Once the transmitter 602 has determined a PIA set, the transmitter 602 is configured to direct all the transmitter and receiver pairs to perform an interference alignment technique that involves signal space alignment. In an aspect the transmitter 602 is configured to determine the precoders and decorrelators for the transmitter and receiver pairs included in the PIA set. In an aspect, the precoders and decorrelators are determined via traditional interference alignment techniques. In another aspect the precoders and decorrelators are determined in accordance with alternative interference mitigation schemes. According to this embodiment, the controller may not be employed. The transmitter communicates the determined filter information the transmitters and receivers of the PIA set respectively. For example, transmitter 602 may determine a PIA set in accordance with aspects described herein and further perform filter assignment for transmitter and receiver pairs of the determined PIA set. In response, the transmitters of each transmitter-receiver pair are configured to precode baseband signals with the determined precoder filter. The associated receiver of each transmitter-receiver pair is further configured to apply the determined decorrelator.

Receiver 612 includes ID component 618 in order to perform interference detection in accordance with the subject PIAID scheme disclosed herein. In particular, the ID component 618 is configured to determine aggregate interference and then detect the desired signal. In an aspect, the ID component 618d detects aggregate interference signals encoded with quadrature phase shift keying (QPSK) and the aggregate interference component is configured to detect the aggregate interference signals using constellation maps derived from the received signals. The ID detection component 618 detects the desired signals by subtracting the aggregate interference signals from output signals of the decorrelators. In an aspect, the ID component 618 employs employ semi-definite relaxation techniques to formulate a detection algorithm having has polynomial complexity to detect the interference free signals. (ID by the receiver is discussed in greater depth infra with respect to FIG. 8).

It should be appreciated that various functions of the PIA component can be employed by any of the transmitter 602, and/or the controller 622. Although transmitter 602, receiver 612 and the central controller 622 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 7:
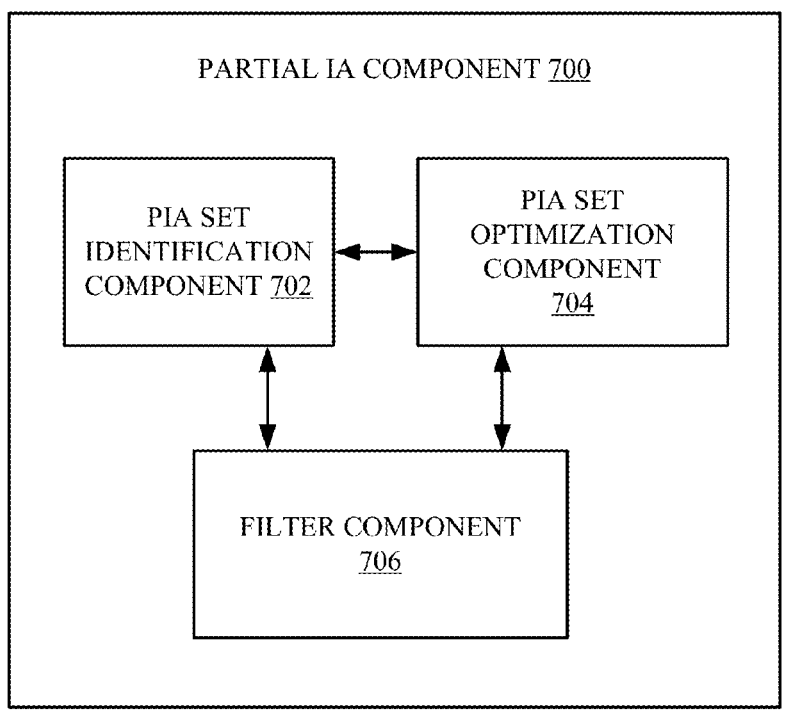
FIG. 7 presents a block diagram of a partial IA (PIA) component 700 in accordance with an embodiment.

Referring now to FIG. 7, presented is a block diagram of a PIA component 700, such as PIA component 606 and/or 622 discussed with regards to FIG. 6. As seen in FIG. 7, PIA component 700 includes PIA set identification component 702, PIA set optimization component 704, and filter component 706. PIA component is configured to determine a PIA set based on the feasibility condition embodied in Eq. 3 as well as path loss to create a favorable interference profile at each receiver for ID processing. A favorable interference profile includes the interference contributing to optimal or high end to end SER performance. As seen in FIG. 5, for example, favorable interference profiles include the interference represented by the graph over the over the dashed line 502. PIA component is configured to select a PIA set which results in optimal or the highest, end to end SER performance. An optimal PIA minimizes the asymptotically tight bound for the SER.

PIA set identification component 702 is configured to determine a PIA sets which satisfy the feasibility condition embodied in Eq. 3. Specifically, a PIA set is defined as $\mathcal{A} = \{\mathcal{A}_k, \forall k\}$, where $\mathcal{A} k=\{k_1, k_2, \ldots, k_\alpha \neq k\}$ denotes the index of aligned transmitters at the receiver k for some constant $\alpha$. In other words, the PIA set identification component 702 determines sets of transmitter receiver pairs based on a number of transmitters that can be aligned at each receiver. The PIA set identification component 702 determines a group of feasible PIA sets. A feasible IA set is one which satisfies Eq. 3:

$$\alpha(\mathcal{A}) \leq \min\left(\frac{M+N}{D} - 2, K-1\right) \text{ and} \quad \text{(Eq. 3)}$$

$$\sum_k 1(i \in \mathcal{A}_k) = \alpha(\mathcal{A}), \forall\, i$$

where $1(\cdot)$ is the indicator function, $\alpha(\mathcal{A}) = |\mathcal{A}_k|$ is the cardinality of $\mathcal{A}_k$ (i.e., the number of aligned interferers at each receiver). The requirement as per Eq. 3 means that each transmitter should be selected by $\alpha(\mathcal{A})$ receivers.

PIA set optimization component 704 is configured to select a PIA set from the feasible PIA sets which optimizes end to end SER at the receiver. In other words, the PIA set optimization component is configured to select a PIA set from the feasible PIA sets which which minimizes the asymptotically tight bound for the average end-to-end SER performance.

Due to heterogeneous path losses and transmit powers, interference links have different contributions to the average end-to-end SER of the subject PIAID scheme. Given a general cost matrix of the interference links $\mathcal{C} = \{c_{ki}, \forall k, i\}$, the a PIA set optimization problem is given by:

$$\text{MaxPIA}: \mathcal{A}^* = \arg\max_{\mathcal{A} \in \mathbb{A}} \sum_{k,i} c_{ki} 1(i \in \mathcal{A}_k), \quad \text{(Eq. 9)}$$

where $\mathcal{A}^*$ is the solution to the MaxPIA problem, and $\mathbb{A}$ denotes the collection of all the PIA sets that satisfies the IA feasibility condition of Eq. 3. In order to select an optimal PIA set, the cost metric $c_{ki}$ is designed to minimize the asymptotically tight bound for the average end-to-end SER performance. (As discusses infra, the cost metric $c_{ki}$ is based on average SER result and is embodied in equation 12 below). Optimization equation 9 is a constrained combinatorial optimization problem, which is difficult in general. Solving problem Eq. 9 using brute force exhaustive search has a high complexity of $O(\exp(K))$ and is not viable in practice.

Therefore, according to an embodiment, the PIA set optimization component 704 transforms optimization problem 9 into a low complexity user set selection algorithm for the PIAID scheme, which minimizes the asymptotically tight bound for the average end-to-end SER performance using graph theory. Graph theory is presented in *C.H. Papadimitriou and k Steiglitz*. "Combinatorial Optimization: Algorithms and Complexity," Mineola, N.Y.: Dover Edition, 1998, the entirety of which is incorporated herein by reference. In order to better understand the transformation of Eq. 9 into a low complexity equation using graph theory, an overview of graph theory is discussed below.

A graph $\mathcal{G}$ is defined by a pair $\mathcal{G} = (\mathcal{W}, \mathcal{E})$, where $\mathcal{W}$ is a finite set of nodes and $\mathcal{E}$ is a finite set of edges. Specifically, the nodes in $\mathcal{W}$ are denoted as $w_1, w_2, \ldots, w_{|\mathcal{W}|}$, and an edge in $\mathcal{E}$ connecting nodes $w_i$ and $w_k$ is denoted as $[w_i, w_k]$. If an edge $e = [w_1, w_2] \in \mathcal{E}$, then we say that e is incident upon $w_1$ (and $w_2$). The degree of a node w of $\mathcal{W}$ is the number of edges incident upon w. A bipartite graph is a graph $\mathcal{B} = (\mathcal{W}, \mathcal{E})$ such that $\mathcal{W}$ can be partitioned into two sets, $\mathcal{W}_1$ and $\mathcal{W}_2$, and each edge in $\mathcal{E}$ has one node in $\mathcal{W}_1$ and one node in $\mathcal{W}_2$. The bipartite graph is usually denoted by $\mathcal{B} = (\mathcal{W}_1, \mathcal{W}_2, \mathcal{E})$. An example of a bipartite graph is illustrated in FIGS. 4A and 4B.

In fact, interference networks can be represented by a bipartite graph $\mathcal{B} = (\mathcal{R}, \mathcal{T}, \mathcal{E})$, where $\mathcal{R} = \{r_1, \ldots, r_K\}$ is the set of the receive nodes, $\mathcal{T} = \{t_1, \ldots, t_K\}$ is the set of the transmit nodes, and $\mathcal{E} = \{[r_k, t_i], \forall k, i \text{ and } k \neq i\}$ is the set of the edges. A feasible PIA set $\mathcal{A}$ is equivalent to a subset of the edges $\mathcal{E}_s$ with the property that the degree of each receive and transmit node of $\mathcal{G}_s = (\mathcal{T}, \mathcal{R}, \mathcal{E}_s)$ is $\alpha(\mathcal{A})$, and $\mathcal{G}_s$ is called a $\alpha$-factor of graph $\mathcal{G}$.

For example, suppose a PIA set is given by $\mathcal{A} = \{\mathcal{A}_1 = \{2, 3\}, \mathcal{A}_2 = \{3, 4\}, \mathcal{A}_3 = \{4, 1\}, \mathcal{A}_4 = \{1, 2\}\}$, the corresponding subset of edges $\mathcal{E}_s$ is given by $\mathcal{E}_s = \{[r_1, t_2], [r_1, t_3], [r_2, t_3], [r_2, t_4], [r_3, t_4], [r_3, t_1], [r_4, t_1], [r_4, t_2]\}$ as illustrated in FIG. 3A. Let $c_{ki}$ denote the cost of edge $[r_k, t_i] \in \mathcal{E}$. Equation 9 is equivalent to finding a $\alpha$-factor of $\mathcal{G}$ with the largest sum of costs. Hence, the optimization of Eq. 9 is similar to a matching problem (finding a 'best' $\alpha$-factor of graph $\mathcal{G}$) on a bipartite graph. By exploiting this equivalence a low complexity optimal solution can be derived. Let $e = \{e_{ki}, \forall k, i\}$ be a set of variables. If the edge $[r_k, t_i]$ is included in the $\alpha$-factor (i.e. the transmit node i is chosen as one of the aligned interferers at receive node k) then $e_{ki} = 1$, otherwise $e_{ki} = 0$. As a result, Eq. 9 is equivalent to $$\{e_{ki}^*\} = \begin{cases} \arg\max_{e_{ki}} \sum_{k,i} c_{ki} e_{ki} \\ \text{s.t} \quad \sum_i e_{ki} = \alpha, \forall\, k \\ \quad\quad \sum_k e_{ki} = \alpha, \forall\, i \\ \quad\quad e_{ki} \in \{0, 1\}, \forall\, k, i \end{cases} \quad \text{(Eq. 10)}$$

where $$\alpha = \min\left(\frac{M+N}{D} - 2, K-1\right).$$

The above problem is a non-convex problem due to the non-convex constraint $e_{ki} \in \{0,1\}$. To get a low complexity solution, the constraints can be relaxed from $e_{ki} \in \{0,1\}$ to $0 \leq e_{ki} \leq 1$. As a result, Eq. 10 becomes a standard linear processing (LP) problem, which can be solved efficiently. In view of the above relaxation, the optimal solution of the LP relaxation problem is also the optimal solution of Eq. 10, i.e. $\tilde{e}_{ki}^* \in \{0,1\}$ where $\tilde{e}_{ki}^*$, is the optimal solution of the LP of relaxed Eq. 10.

As noted above, in order to select an optimal PIA set, the cost metric $c_{ki}$ is designed to minimize the asymptotically tight bound for the average end-to-end SER performance. The cost metric $c_{ki}$ is based on the average SER of the PIAID scheme for a given PIA set $\mathcal{A}$ and the path gains $\{L_{ki}P_i, \forall k, i\}$. Unlike standard SER analysis in existing literature, a key challenge of SER analysis in the PIAID scheme is that the residual interference in the stage I and stage II ID processing are non-Gaussian due to the discrete constellation inputs. The cost metric $c_{ki}$ is determined as follows.

For a given PIA set $\mathcal{A}$, the SER of the l-th data stream at the k-th receiver in the interference limited regime of the PIAID scheme is given by $$\overline{SER}_k^l(\mathcal{A}) @ \mathbb{E}_{\mathcal{H}}[SER_k^l(\mathcal{A}, \mathcal{H})] @ \qquad \text{(Eq. 11)}$$

$$\mathbb{E}_{\mathcal{H}}\left[\sum_{x_k^l} Pr\{x_k^l\} Pr\{\hat{x}_k^l \neq x_k^l | x_k^l, \mathcal{A}, \mathcal{H}\}\right] =$$

$$\text{black}\Theta\left(\sum_{i \in Q_k} \frac{P_k L_{kk}}{P_i L_{ki}} + \sum_{i \in O_k} \frac{P_i L_{ki}}{P_k L_{kk}}\right),$$

where $\mathcal{H} = \{H_{ki}, \forall k, i\}$. $g(x) = \Theta(f(x))$ denotes $$\limsup_{x \to 0} \frac{g(x)}{f(x)} \leq C$$

and $$\liminf_{x \to 0} \frac{g(x)}{f(x)} \geq c$$

for some constants $C \geq c \geq 0$.

In an aspect, the SER in Eq. 11 is averaged over realizations of the channels and noise. The result in Eq. 11 indicates that the SER of the PIAID scheme favors either very strong or very weak residual interference. In other words, there is always an unfavorable window of residual interferences as illustrated in FIG. 4. The role of PIA is to eliminate these unfavorable windows of interferences so that the ID processing is given a more favorable interference profile. In order to eliminate these unfavorable windows of interferences the interference cost metric in the PIA set optimization problem 9 or 10 is set to $$c_{ki} = \begin{cases} -C & \text{if } i = k \\ \frac{P_k L_{kk}}{P_i L_{ki}} & \text{else if } P_i k_{ki} \geq P_k L_{kk} \\ \frac{P_i L_{ki}}{P_k L_{kk}} & \text{otherwise,} \end{cases} \qquad \text{(Eq. 12)}$$

$$\forall k \in \mathcal{K}$$

where $C > 0$ is a large constant (a sufficiently large C can be chosen as: $C > \Sigma_{k,i \neq k} |c_{ki}|$). Based on these interference cost metrics, the PIA set selection solutions solved by the LP relaxation of Eq. 10 is order-optimal with respect to the following problem:

$$\mathcal{A}^* = \operatorname*{argmax}_{\mathcal{A} \in \mathbb{A}} \sum_{k,l} \overline{SER}_k^l(\mathcal{A}). \qquad \text{(Eq. 13)}$$

An order-optimal solution means that it minimizes the asymptotically tight bound for the SER. The PIA set selection solutions solved by the LP relaxation of Eq. 10 with cost metrics in accordance with Eq. 12 is order optimal with respect to Eq. 13 as follows:

$$\mathcal{A}^* = \operatorname{argmin}_{\mathcal{A} \in \mathbb{A}} \Theta\left(\sum_{k, i \in Q_k} \frac{P_k L_{kk}}{P_i L_{ki}} + \sum_{k, i \in O_k} \frac{P_i L_{ki}}{P_k L_{kk}}\right) = \operatorname{argmin}_{\mathcal{A} \in \mathbb{A}} \Theta$$

$$\left(\sum_{k, i \neq k} \frac{P_k L_{kk}}{P_i L_{ki}} 1(P_i L_{ki} \geq P_k L_{kk}) - \Sigma_{k,i \in \mathcal{A}_2} \frac{P_k L_{kk}}{P_i L_{ki}} 1(P_i L_{ki} \geq P_k L_{kk}) +\right.$$

$$\sum_{k, i \neq k} \frac{P_i L_{ki}}{P_k L_{kk}} 1(P_i L_{ki} < P_k L_{kk}) - \Sigma_{k,i \in \mathcal{A}_u} \frac{P_i L_{ki}}{P_k L_{kk}} 1(P_i L_{ki} < P_k L_{kk}) =$$

$$\operatorname{argmax}_{\mathcal{A} \in \mathbb{A}} \Theta\left(\Sigma_{k,i \in \mathcal{A}_u} \frac{P_k L_{kk}}{P_i L_{ki}} 1(P_i L_{ki} \geq P_k L_{kk}) +\right.$$

$$\left.\Sigma_{k,i \in \mathcal{A}_u} \frac{P_i L_{ki}}{P_k L_{kk}} 1(P_i L_{ki} < P_k L_{kk})\right)$$

Hence, the $$\left(\sum_{k, i \in Q_k} \frac{P_k L_{kk}}{P_i L_{ki}} + \sum_{k, i \in O_k} \frac{P_i L_{ki}}{P_k L_{kk}}\right)$$

is an asymptotically tight bound for SER when $P_k L_{kk}?P_i L_{ki}$ or $P_k L_{kk} = P_i L_{ki}$ for all $\{k, i\}$.

Filter component 706 is configured to determine the precoders and decorrelators for the transmitters and receivers respectively, of a PIA set. Only the transmit nodes that belong to $\mathcal{A}_k$ will align their transmit signals by choosing precoders and decorrelators in accordance with signal space interference alignment schemes. In an aspect, the filter component 706 select precoders and decorrelators according to the traditional IA requirements. In particular, the transmit nodes that belong to $\mathcal{A}_k$ will align their transmit signals by choosing precoders and decorrelators $\{V_k, U_k, \forall k\}$ satisfying rank $((U_k)^\dagger H_k V_k) = D, \forall k$. In another aspect, the filter component 706 can select precoders and decorrelators in accordance with any type of interference mitigation scheme. As noted above, the PIA aspect of the PIAID scheme selects a set $\mathcal{A}$ comprising a subset of receivers to align interferers with based on the notion that for constant MIMO interference channels, it is not always possible to completely align all the K−1 interferers at each receiver. The precoders and decorrelators selected by filter component 706 are dependent on the channels in the set $\mathcal{A}$ for which interference is aligned. Since the interference from these channels involved are nulled, the remaining interference has a random channel matrix even though it is projected on the space $U_k$.

Figure 8:
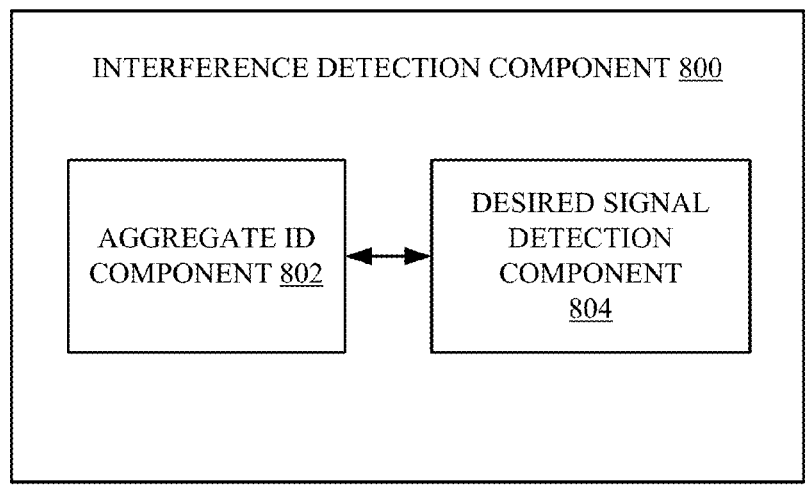
FIG. 8 presents a block diagram of an ID component 800 in accordance with an embodiment.

Turning now to FIG. 8, presented is a block diagram of an ID component 800, such as ID component 618 discussed with regards to FIG. 6. As noted above, interference detection is performed at receiver nodes. ID involves two phases. The first phase is aggregate interference detection and the second phase is desired signal detection. Accordingly, ID component includes an aggregate ID component 802, and a desired signal detection component 804.

Aggregate ID component 802 is configured to estimate the aggregate interference signal using constellation maps derived from the QPSK inputs. For instance, the normalized received signal at the k-th receiver is given by:

$$y_k = \sqrt{P_k L_{kk}} H_{kk} v_k^l x_k^l + \underbrace{\sum_{d \neq l} \sqrt{P_k L_{kk}} H_{kk} v_k^d x_k^d}_{\text{inter-stream interference}} + \quad \text{(Eq. 4)}$$

$$\underbrace{\sum_{i \notin \mathcal{A}_k; d} \sqrt{P_i L_{ki}} H_{ki} v_i^d x_i^d}_{\text{non-aligned interferers}} + \underbrace{\sum_{i \in \mathcal{A}_k; d} \sqrt{P_i L_{ki}} H_{ki} v_i^d x_i^d}_{\text{aligned interferers}} + z_k.$$

By using the l-th column of $U_k$ in Eq. 2, $u_k^l$, as the decorrelator, the post-processed signal of the l-th stream is given by:

$$\tilde{y}_k^l = (u_k^l)^\dagger y_k \quad \text{(Eq. 5)}$$

$$= \sqrt{P_k L_{kk}} H_{kk}^{ll} x_k^l + \underbrace{\sum_{i \notin \mathcal{A}_k; d} \sqrt{P_i L_{ki}} H_{ki}^{ld} x_i^d}_{\text{non-aligned interferers}} + (u_k^l)^\dagger z_k,$$

where $H_{ki}^{ld} = (u_k^l)^\nabla H_{ki} v_i^d$ is the equivalent channel gain for the d-th data stream of transmitter i at receiver k. In an aspect, the inter-stream interference and the interference contributed by users in the IA set $\mathcal{A}_k$ is completely eliminated due to the PIA requirement in Eq. 2.

According to an embodiment, the aggregate ID component 802 estimates the aggregate strong interference. In particular, ID at the receiver is more effective when the interference is stronger than the desired signal. Mathematically, $\mathcal{Q}_k = \{i: P_i L_{ki} \geq P_k L_{kk}, \forall i \notin \mathcal{A}_k, i \neq k\} \subseteq \{1, \ldots, K\}$ denotes the set of strong residual interference. In an aspect, the aggregate ID component 802 estimates the aggregate strong interference $I_k^l = \sum_{i \in \mathcal{Q}_k; d} \sqrt{P_i L_{ki}} H_{ki}^{ld} x_i^d$ using a nearest neighbor detection rule emboided in Eq. 6. For example, based on the decorrelator output, $\tilde{y}_k^l$, the detected aggregate strong interference $\hat{I}_k^l$ is given by:

$$(\hat{I}_k^l)^* = \arg\min_{c \in \mathcal{I}_k^l} |\tilde{y}_k^l - c|, \quad \text{(Eq. 6)}$$

where $\mathcal{I}_k^l = \{\sum_{i \in \mathcal{Q}_k; d} \sqrt{P_i L_{ki}} H_{ki}^{ld} s_i^d : s_i^d \in \mathcal{S}\}$ is the set of possible values the strong interference from $\mathcal{Q}_k$ can take. In an aspect, when $\mathcal{Q}_k = \emptyset$, there will be no stage I decoding for the desired data stream $x_k^l$.

According to another embodiment, the aggregate ID component 802 estimates the aggregate strong interference via a simplified nearest neighbor rule. In aggregate interference dinterference detection at the receiver can be substantially simplified using semi-definite relaxation (SDR) techniques. The complexity of the decoding algorithm embodied in Eq. 6 is exponential with respect to the cardinality of the set of strong residual interferences, i.e., $|\mathcal{Q}_k|$.

Using the SDR technique a low complexity ID algorithm, which is a simplified nearest neighbor rule, can be derived which has polynomial complexity with respect to $|\mathcal{Q}_k|$. To utilize the SDR technique, we first simplify Eq. 5 as follows:

$$\tilde{y}_k^l = (h_Q)^T x_Q + \underbrace{\sqrt{P_k L_{kk}} H_{kk}^{ll} x_k^l + \sum_{i \in O_k; d} \sqrt{P_i L_{ki}} H_{ki}^{ld} x_i^d + (u_k^l)^\dagger z_k}_{n_0}, \quad \text{(Eq. 14)}$$

where $\mathbf{x}_Q = [x_{i_1}^1, \ldots, x_{i_1}^D, x_{i_2}^1, \ldots, x_{i_Q}^D]^T \in \mathcal{S}^{DQ \times 1}$ is DQ interference symbols, and $Q = |\mathcal{Q}_k|$ is the cardinality of $\mathcal{Q}_k \cdot h = [\sqrt{P_{i_1} L_{ki_1}} H_{ki_1}^{l1}, \ldots, \sqrt{P_{i_1} L_{ki_1}} H_{ki_1}^{lD}, \sqrt{P_{i_2} L_{ki_2}} H_{ki_2}^{l1}, \ldots, \sqrt{P_{i_Q} L_{ki_Q}} H_{ki_Q}^{lD}]^T \in \mathbb{C}^{DQ \times 1}$ is the channel gain for the interference symbols $\mathbf{x}_Q$. Furthermore, the real valued form of Eq. 14 can be expressed as:

$$[\Re\{\tilde{y}_k^l\}]_{y_R} = [\Re\{(h_Q)^T\} - \Im\{(h_Q)^T\}]_{H_R} [\Re\{x_Q\}]_{x_R} + [\Re\{n_0\}]_{n_{R'}} \quad \text{(Eq. 15)}$$

where $y_R \in \mathbb{R}^{2 \times 1}$, $H_R \in \mathbb{R}^{2 \times 2DQ}$, $x_R \in \{\pm 1\}^{2DQ \times 1}$ and $n_R \in \mathbb{R}^{2 \times 1}$.

In view of the above decoding Eq. 6 is equivalent to $$(x_R)^* = \arg\min_{x_R \in \{\pm 1\}^{2DQ \times 1}} \|y_R - H_R x_R\|, \quad \text{(Eq. 16)}$$

such that the detected aggregate strong interference $(\hat{I}_k^l)^* = (hQ)^T(xQ)^*$, where $(xQ)^*$ is determined from $(x_R)^*$ as indicated in Eq. 15. The above problem Eq. 16 can be equivalently expressed as $$s^* = \begin{cases} \arg\min_s \text{trace}(WS) \\ \text{s.t} \quad \text{diag}(S) = I_{2DQ+1} \\ S = ss^T \end{cases} \quad \text{(Eq. 17)}$$

where $(\cdot)^T$ denotes the transpose, $$W = \begin{bmatrix} (H_R)^T H_R & -(H_R)^T y_R \\ -(y_R)^T H_R & 0 \end{bmatrix} \text{ and } s = [x_R \quad \text{(Eq. 18)}$$

By means of SDR, we relax the constraint $S = ss^T$ by $S \pm 0$ (i.e., $S \in \mathbb{C}^{n \times n}$ is positive-semidefinite), and Eq. 17 degenerates into the following semi-definite problem (SDP) that can be solved efficiently in $O(Q^{3.5})$ time, e.g., using interior-point optimization technique as follows:

$$S^* = \begin{cases} \arg\min_s \text{trace}(WS) \\ \text{s.t} \quad \text{diag}(S) = I_{2DQ+1} \\ S \pm 0. \end{cases} \quad \text{(Eq. 19)}$$

If the optimal value $S^*$ of the Eq. 19 is rank one, then the relaxation is tight, and the optimal solution of the $(x_R)^*$ is given by:

$$[(x_R)^*]_{(n,1)} = f_x(r, n) \quad \text{(Eq. 20)}$$

$$= \begin{cases} 1 & \text{if } \frac{[r]_{(n,1)}}{[r]_{(|r|,1)}} \geq 0 \\ -1 & \text{else,} \end{cases} \quad \forall n \in \{1, \ldots, |r| - 1\}$$

where r is the eigenvector of $S^*$ associated with the only one non-zero eigenvalue.

On the other hand, if $S^*$ is not rank one, then $(x_R)^*$ is approximated based on $S^*$. For example, techniques such as randomization, rank-1 approximation and dominant eigenvector approximation can be employed to determine $(x_R)^*$. In an aspect, to further improve the quality of the approximation $(x_R)^*$ a semi-definite relaxation signal interference detection (SDR-SID) algorithm based on the dominant eigenvector approximation can be employed.

Figure 9:
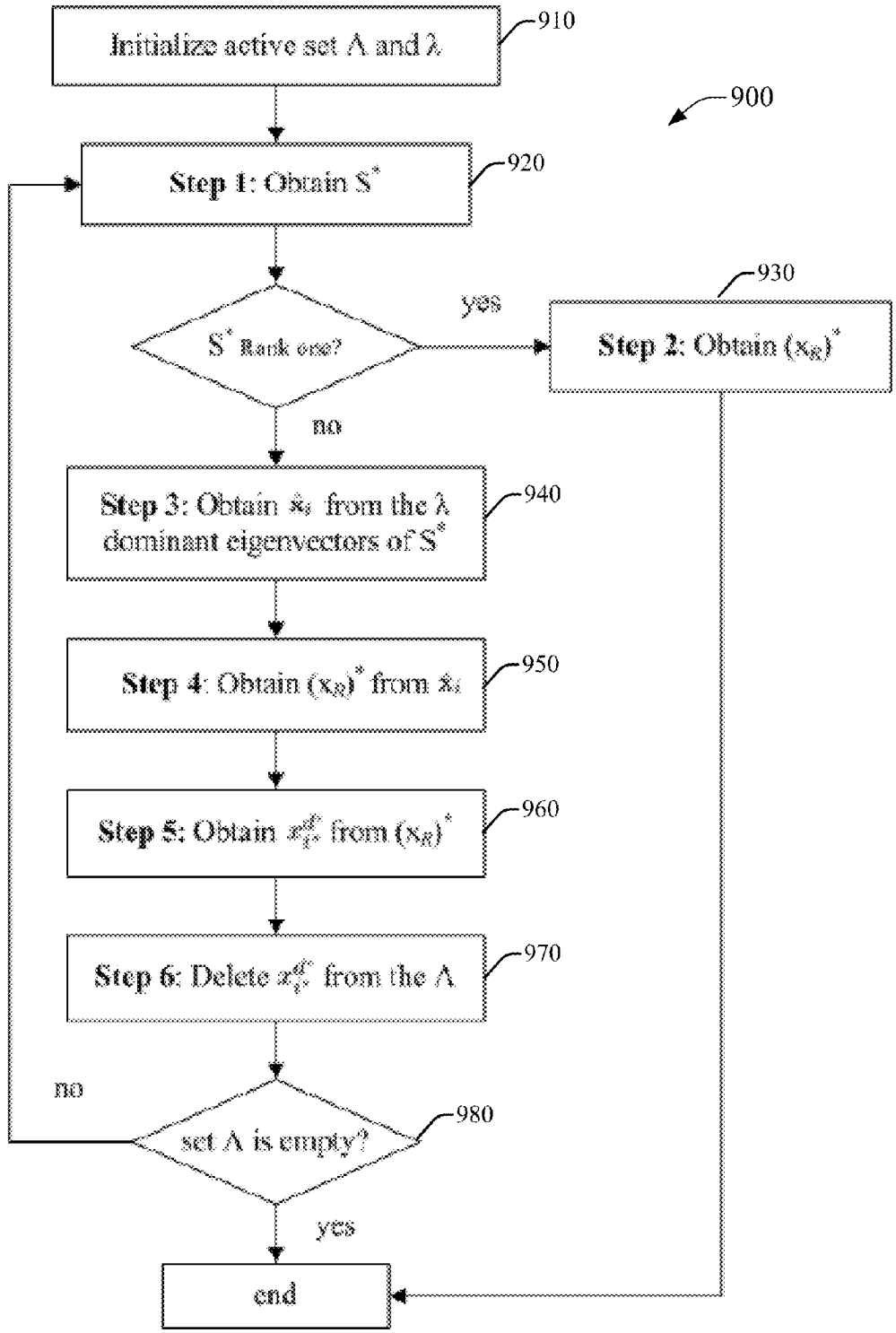
FIG. 9 illustrates a flow diagram of an SDR-SID algorithm 900 in accordance with an embodiment.

FIG. 9 illustrates a flow diagram of an SDR-SID algorithm 900 in accordance with an embodiment. The SDR-SID algorithm can be employed by the aggregate ID component 802 in order to detect aggregate interference. As seen in FIG. 9, at 902, active set $\Lambda$ is first initialized. In particular, $\Lambda = \{x_{i_1}^{1}, \ldots, x_{i_1}^{D}, x_{i_2}^{1}, \ldots, x_{i_Q}^{D}\}$ such that the active set contains all the decoding data streams, and the cardinality is $\lambda = |\Lambda| = DQ$. In an aspect, initialization at 902 is repeated. At 904, according to the active set $\Lambda$, solve optimization Eq. 19 to obtain $S^*$. At 906, if $S^*$ is rank one, $(x_R)^*$ is determined using Eq. 20 and the SDR-SID algorithm 900 is terminated. AT 908, if $S^*$ is not rank one, the $\lambda$ dominant eigenvectors of $S^*$, $\{r_1, \ldots, r_\lambda\}$ are extracted and $[\hat{x}_i]_{(n,1)} = f_x(r_i, n)$ is computed from Eq. 20 where $\forall i \in \{1, \ldots, \lambda\}$ and $\forall n \in \{1, \ldots, 2\lambda\}$. Then at 910 $(x_R)^*$ is obtained by computing $S_i = [\hat{x}_i, 1]^T [\hat{x}_i, 1]$, $\forall i \in \{1, \ldots, \lambda\}$ and choosing $(x_R)^* =$ where $i^* = \text{argmin}_{i \in \{1, \ldots, \lambda\}} \text{trace}(WS_i)$. AT 912, $x_{i^*}^{d^*}$ is determined from $(x_R)^*$, where $\{i^*, d^*\} = \text{argmax}_{i,d} |\sqrt{P_i L_{ki}} H_{ki}^{ld}| 1(x_i^d \in \Lambda)$. Then at 914, $x_{i^*}^{d^*}$ is deleted from the active set $\Lambda$ by setting et $y_k^{l} = y_k^{l} - \sqrt{L_{ki^*}} H_{ki^*}^{ld^*} x_{i^*}^{d^*}$, deleting $x_{i^*}^{d^*}$ from the active set $\Lambda$ and setting $\lambda = \lambda - 1$. If after 914 the active set $\Lambda$ is empty, then the SDR-SID algorithm is terminated. However, if after 914 the active set i is not empty, then steps 904-914 are repeated until the active set $\Lambda$ is empty.

The following process is a demonstration of implementation of algorithm SDR-SID in view of process 900. Suppose $_y k$ in Eq. 14 is given by $y_k^{l} = \sqrt{P_1 L_{k1}} H_{k1}^{l1} x_1^{1} + \sqrt{P_2 L_{k2}} H_{k2}^{l2} x_2^{1} + n_0$ with $|\sqrt{P_2 L_{k2}} H_{k2}^{l2}| > |\sqrt{P_1 L_{k1}} H_{k1}^{l1}|$. The details of the implementation of SDR-SID are given below. Initialization is performed at 902 by setting active set $\Lambda = \{x_1^{1}, x_2^{1}\}$ and $\lambda = 2$. Then, supposing $S^*$ is not rank one, we move to 908 and extract the 2 dominant eigenvectors of $S^*$, $\{r_1, r_2\}$, and obtain $\{\hat{x}_1, \hat{x}_2\}$ from Eq. 20. At 910, supposing trace $(WS_1)<\text{trace}(WS_2)$, we choose $(x_R)^* = \hat{x}_1$. Next, at 912, since $|\sqrt{P_2 L_{k2}} H_{k2}^{l2}| > |\sqrt{P_1 L_{k1}} H_{k1}^{l1}|$, we determine $x_2^{1}$ from $(x_R)^*$, i.e., $x_2^{1} = [(x_R)^*]_{(2,1)} + j[(x_R)^*]_{(4,1)}$, which by definition $xQ = [x_1^{1}, x_2^{1}]$. Lastly, at 914, we set $y_y^{l} = y_k^{l} - \sqrt{P_2 L_{k2}} H_{k2}^{l1} x_2^{1} = \sqrt{P_1 L_{k1}} H_{k1}^{l1} x_1^{1} + n_0$, $\Lambda = \{x_1^{1}\}$ and $\lambda = 1$, and repeat steps 904-914 to obtain $x_1^{1}$.

The Algorithm SDR-SID algorithm is motivated from the intuition that the error probability of decoding symbol $x_i^d$, $\forall i \in Q_k, \forall d$ is small if its channel gain $\sqrt{P_i L_{ki}} H_{ki}^{ld}$ is large. Note that the complexity of the SDR-SID algorithm mainly determined by the complexity of solving the optimization Eq. 19 at step 904 to obtain $S^*$. In an aspect, the complexity for obtaining $S^*$ is in $O(Q^{3.5})$ time. Accordingly the overall complexity of the SDR-SID algorithm is $O(Q^{4.5})$.) Furthermore, it can be easily generalized to other approximation techniques by simply modifying the way to determine $\hat{x}_i$ in step 910. As presented infa, the average end-to-end SER performance of the low complexity SDR-SID algorithm is similar to the performance of the nearest neighbor solution of Eq. 6.

Turning back to FIG. 8, with reference to stage II processing, the desired signal detection component 804 is configured to detect the desired signal by subtracting the estimated aggregate interference from the decorrelator output. In particular, estimated aggregate strong interference $(\hat{I}_k^{l})^*$ is first subtracted from the decorrelator output $y_k^{l}$ as illustrated:

$$\tilde{y}_k^l = y_k^l - \text{black}(\hat{I}_k^l)^* = \sqrt{P_k L_{kk}} H_{kk}^{ll} x_k^l + I_k^l - (I_k^l)^* + \underbrace{\sum_{i \in O_k; d} \sqrt{P_k L_{ki}} H_{ki}^{ld} x_i^d + (u_k^l)^\dagger z_k}_{\text{residual interference}}, \quad \text{(Eq. 7)}$$

Where $O_k = \{i: P_i L_{ki} < P_k L_{kk}, \forall i \notin \mathcal{A}_k, i \neq k\} \subseteq \{1, \ldots, K\}$ denotes the set of weak residual interference, and obviously we have $O_k \cup Q_k \cup \mathcal{A}_k \cup \{k\} = \mathcal{K}$. In turn, the desired signal detection component 804 detects the desired signal for receiver k is based on $\tilde{y}_k^l$ using the stage II minimum-distance algorithm embodied in Eq. 8. In particular, the desired signal detection component detects the l-th data symbol at the k-th receiver $x_k^l$ is based on $\tilde{y}_k^l$ according to the minimum-distance rule given by:

$$\Re\{(\hat{x}_k^l)^*\} = \begin{cases} \frac{\sqrt{2}}{2} & \text{if } \Re\left\{\frac{\tilde{y}_k^l}{\sqrt{P_k L_{kk}} H_{kk}^{ll}}\right\} \geq 0 \\ -\frac{\sqrt{2}}{2} & \text{else} \end{cases} \quad \text{(Eq. 8)}$$

$$\Im\{(\hat{x}_k^l)^*\} = \begin{cases} \frac{\sqrt{2}}{2} & \text{if } \Im\left\{\frac{\tilde{y}_k^l}{\sqrt{P_k L_{kk}} H_{kk}^{ll}}\right\} \geq 0 \\ -\frac{\sqrt{2}}{2} & \text{else} \end{cases}$$

In view of the example system(s) and apparatuses described above, example method(s) that can be implemented in accordance with the disclosed subject matter can be better appreciated with reference to flowcharts of FIGS. 10-13. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 10:
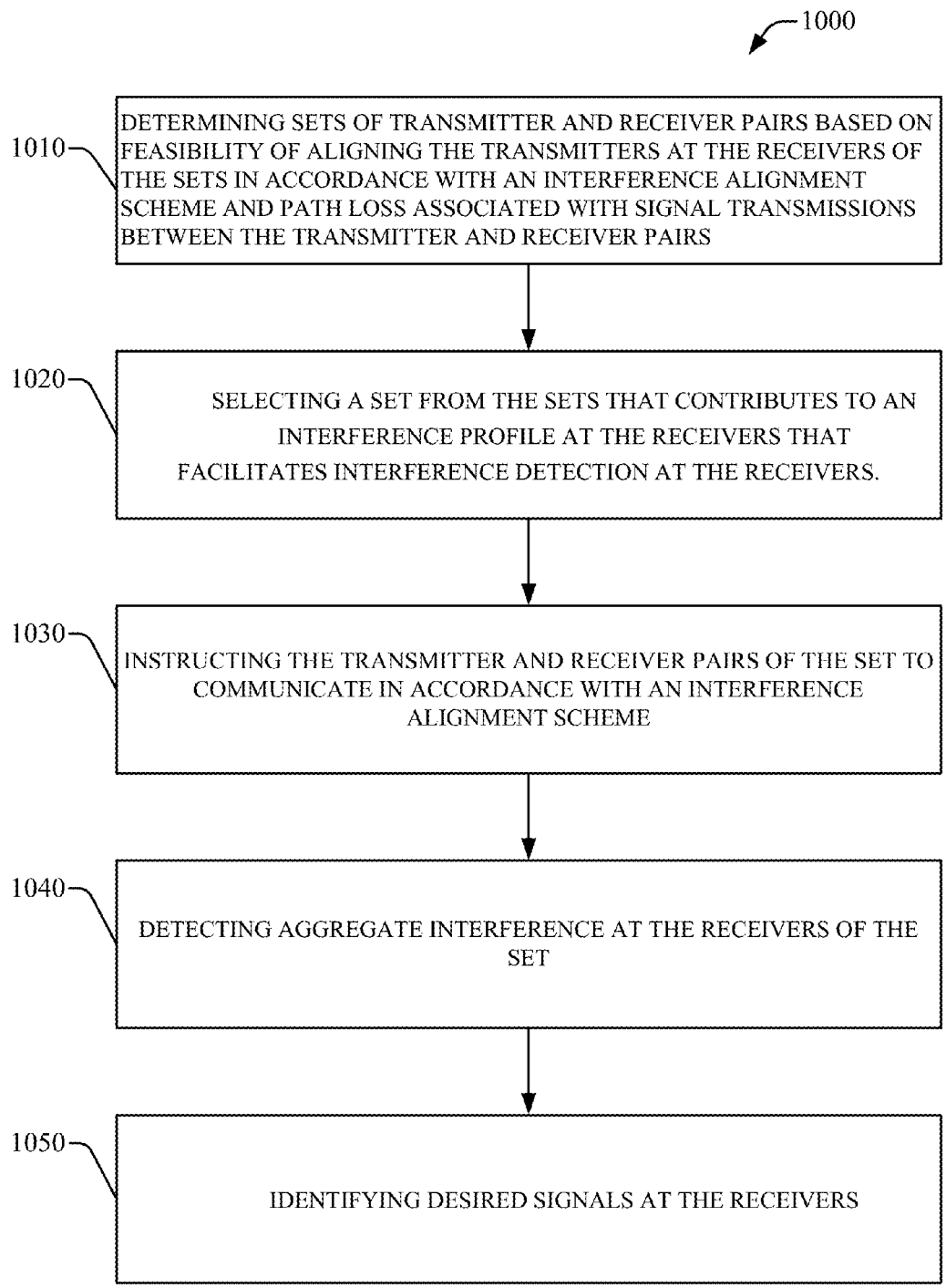
FIG. 10 presents a high level flow diagram of a process 1000 for mitigating interference in accordance with the subject PIAID scheme.

FIG. 10 presents a high level flow diagram of a process 1000 for mitigating interference in accordance with the subject PIAID scheme. At 1010 sets of transmitter and receiver pairs are determined based on feasibility of aligning the transmitters at the receivers of the sets in accordance with an interference alignment scheme and path loss associated with signal transmissions between the transmitter and receiver pairs. In an aspect, the sets include different alignment assignments of the respective transmitters at the respective receivers of the sets including different numbers of the transmitters aligned at the receivers of the sets. At 1020, tan optimal set is selected from the sets, where the optimal set contributes to an interference profile at the receivers that facilitates interference detection at the receivers. For example, in an aspect, selecting the optimal set comprises determining average symbol error rates associated with respective ones of the sets and selecting a set from the sets that contributes to the smallest asymptotically tight bound for average end-to-end symbol error rate performance at the receivers. At 1030, the transmitter and receiver pairs are instructed to communicate in accordance with an interference alignment scheme. At 1040, the aggregate interference is detected at the receivers, and at 1050, the desired signal (i.e, the interference free signal) is detected at the receivers.

Figure 11:
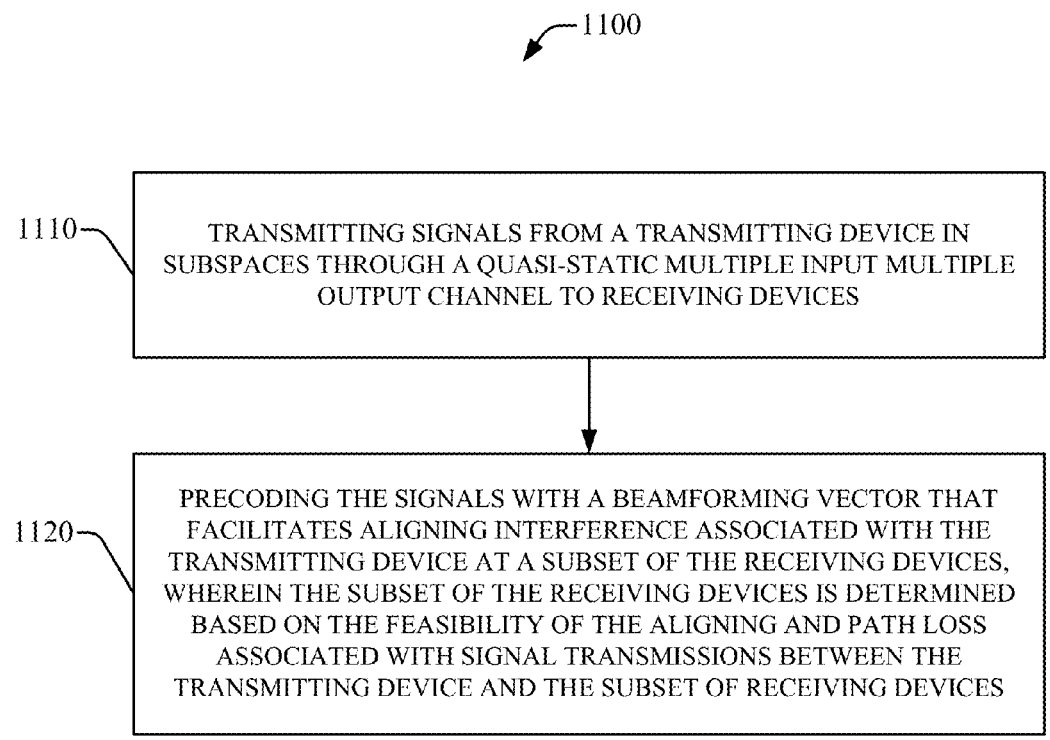
FIG. 11 illustrates a process 1100 for transmitting signals from the transmitters in accordance with the subject PIAID scheme.

FIG. 11 illustrates a process 1100 for transmitting signals from the transmitters in accordance with the subject PIAID scheme. At 1110, a transmitting device transmits signals in subspaces through a quasi-static multiple input multiple output channel to receiving devices. At 1220, the transmitting device precodes the signals with a beamforming vector that facilitates aligning interference associated with the transmitting device at a subset of the receiving devices, wherein the subset of the receiving devices is determined based on the feasibility of the aligning and path loss associated with signal transmissions between the transmitting device and the subset of receiving devices. In an aspect, the subset of the receiving devices is determined based on interference profiles at the receiving devices that facilitate interference detection at the receiving devices, wherein the interference profiles are created in response to the aligning.

Figure 12:
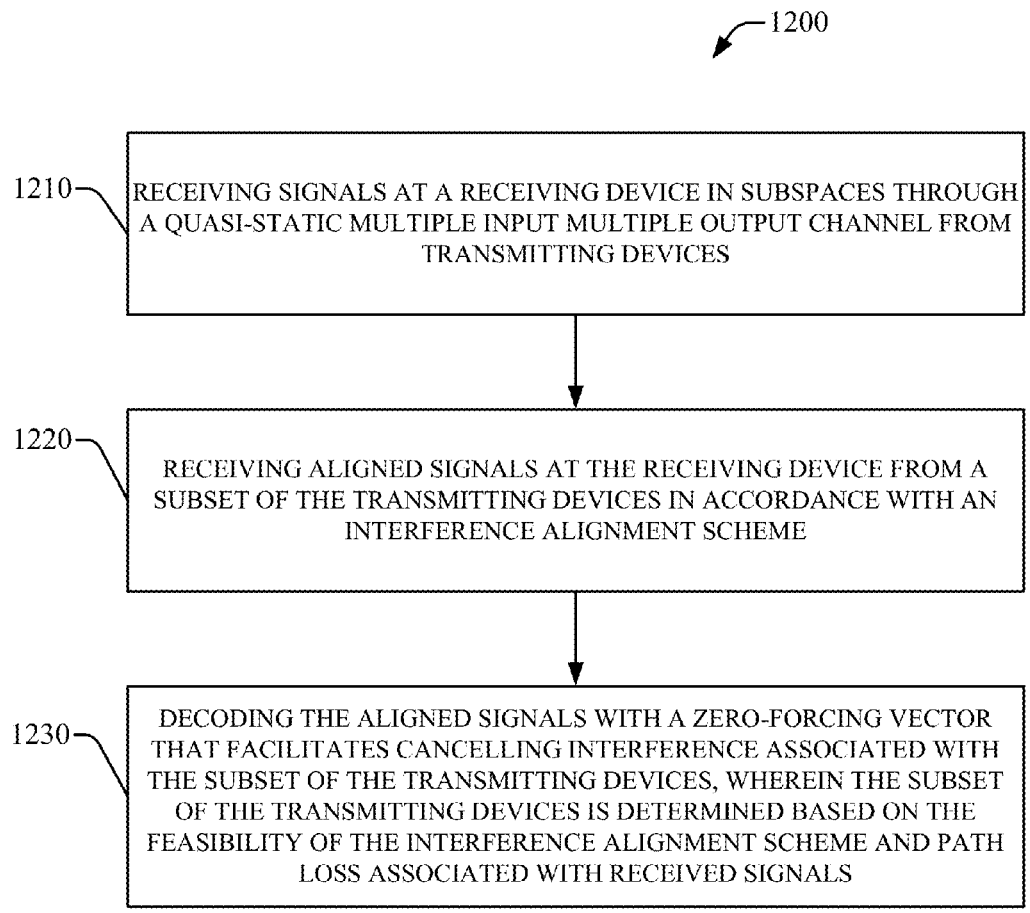
FIG. 12 illustrates a process 1200 for receiving signals at receiving devices in accordance with the subject PIAID scheme.

FIG. 12 illustrates a process 1200 for receiving signals at receiving devices in accordance with the subject PIAID scheme. At 1210 signals are received at a receiving device in subspaces through a quasi-static multiple input multiple output channel from transmitting devices. At 1220, aligned signals are received at the receiving device from a subset of the transmitting devices in accordance with an interference alignment scheme. At 1230, the aligned signals are decoded with a zero-forcing vector that facilitates cancelling interference associated with the subset of the transmitting devices, wherein the subset of the transmitting devices is determined based on the feasibility of the interference alignment scheme and path loss associated with received signals. In an aspect, the subset of the transmitting devices is determined based on an interference profile at the receiving device that facilitates interference detection by the receiving device, wherein the interference profile is created in response to the interference alignment scheme.

Figure 13:
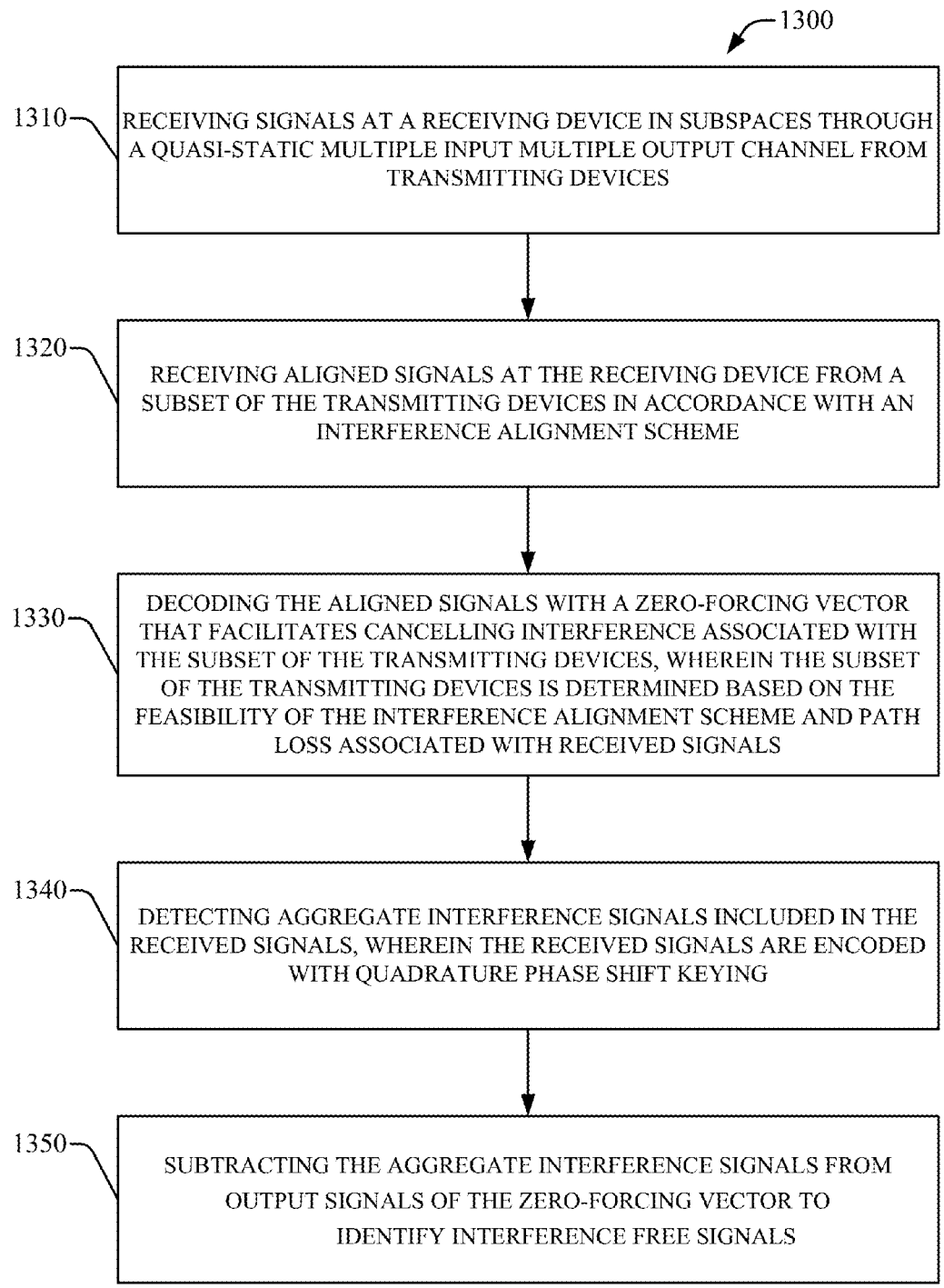
FIG. 13 illustrates another process 1300 for receiving signals at receiving devices in accordance with the subject PIAID scheme.

FIG. 13 illustrates another process 1300 for receiving signals at receiving devices in accordance with the subject PIAID scheme. At 1310 signals are received at a receiving device in subspaces through a quasi-static multiple input multiple output channel from transmitting devices. At 1320, aligned signals are received at the receiving device from a subset of the transmitting devices in accordance with an interference alignment scheme. At 1330, the aligned signals are decoded with a zero-forcing vector that facilitates cancelling interference associated with the subset of the transmitting devices, wherein the subset of the transmitting devices is determined based on the feasibility of the interference alignment scheme and path loss associated with received signals. In an aspect, the subset of the transmitting devices is determined based on an interference profile at the receiving device that facilitates interference detection by the receiving device, wherein the interference profile is created in response to the interference alignment scheme. At 1340, the aggregate interference signals included in the received signals, are detected, wherein the received signals are encoded with quadrature phase shift keying. At 1350, the interference free signals are detected by subtracting the aggregate interference signals from output signals of the zero-forcing vector.

The two part PIAID scheme described herein has proved to be an effective tool for increasing throughput of MIMO systems. As presented below, performance of the proposed scheme was examined in K-pair quasi-static MIMO interference network such as model environment 200 described with reference to FIG. 2. Specifically, we set the log-normal shadowing standard deviation as $\sigma_\omega = 12$ dB and the path loss exponent as $\gamma = 6$ as. Each transmitter delivered a single stream (D=1) of QPSK symbols. The transmit power of each node was assumed to be the same. In the simulations, all the transmit and receive nodes were assumed randomly distributed in a 2 km×1 km rectangular area. The simulations demonstrated that SER performance of the proposed PIAID scheme has significant gain compared with various conventional baseline solutions. In particular, the performance of the proposed PIAID schemes were compared with the following baselines.

Proposed Scheme 1 (PS1) included the proposed PIAID scheme where the PIA set optimization stage tried to align the unfavorable interference links by setting the interference cost metric according to Eq. 12, and the ID processing was adopted at each of the K receivers after PIA. Specifically, Eq. 6 was employed to determine aggregate interference, and Eq. 8 is employed to determine the desired signal at stage I and stage II processing, respectively.

Proposed Scheme 2 (PS2) included the proposed PIAID scheme where the PIA set optimization stage tried to align the unfavorable interference links by setting the interference cost metric according to Eq. 12, and the ID processing was adopted at each of the K receivers after PIA. Specifically, the SDR-SID algorithm was employed to determine aggregate interference, and Eq. 8 is employed to determine the desired signal at stage I and stage II processing, respectively.

Baseline 1 (BL1) included randomized PIA wherein the PIA set $\mathcal{A}$ was chosen randomly from $\mathbb{A}$, i.e., the collection of all the PIA sets that satisfies the IA feasibility condition of Eq. 3, and ID processing was adopted at each of the K receivers after PIA. Specifically, Eq. 6 was employed to determine aggregate interference, and Eq. 8 is employed to determine the desired signal at stage I and stage II processing, respectively.

Baseline 2 (BL2) included iterative IA. In particular, alternating optimization was utilized to minimize the weighted sum leakage interference, and conventional one-stage decoding was adopted at each of the K receivers by treating all the interference as noise.

Baseline 3 (BL3) included maximizing SINR. In particular, alternating optimization was utilized to maximize the SINR at the receivers, and conventional one-stage decoding was adopted at each of the K receivers by treating all the interference as noise.

Baseline 4 (BL4) included maximizing sum-rate. In particular, a gradient ascent approach combined with the alternating optimization was utilized to maximize the sum-rate of the receivers. Conventional one-stage decoding was adopted at each of the K receivers by treating all the interference as noise.

Baseline 5 (BL5) included minimizing the mean square error (MSE). In particular, a joint design was employed to minimize the sum of the MSE of the receivers. conventional one-stage decoding is adopted at each of the K receivers by treating all the interference as noise.

Figure 14:
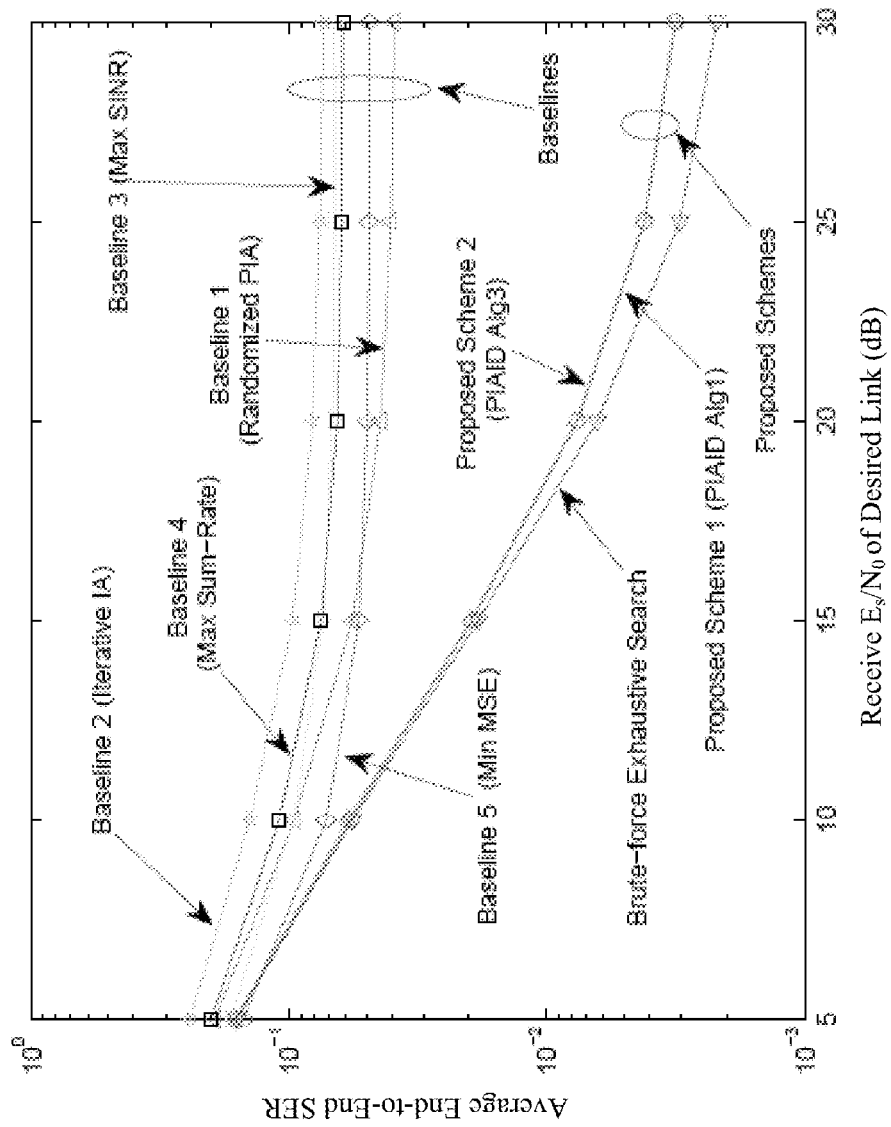
FIG. 14 illustrates the average end-to-end SER performance versus the receive energy per symbol to noise density with 5 users.

FIG. 14 illustrates the average end-to-end SER performance versus the receive energy per symbol to noise density ($E_s/N_0$ dB). The setup was given by K=5 (number of users), {M=3, N=2} (number of transmit and receive antennas), D=1 (number of data stream), and $\alpha$=3 (number of aligned users for feasible interference alignment).

Figure 15:
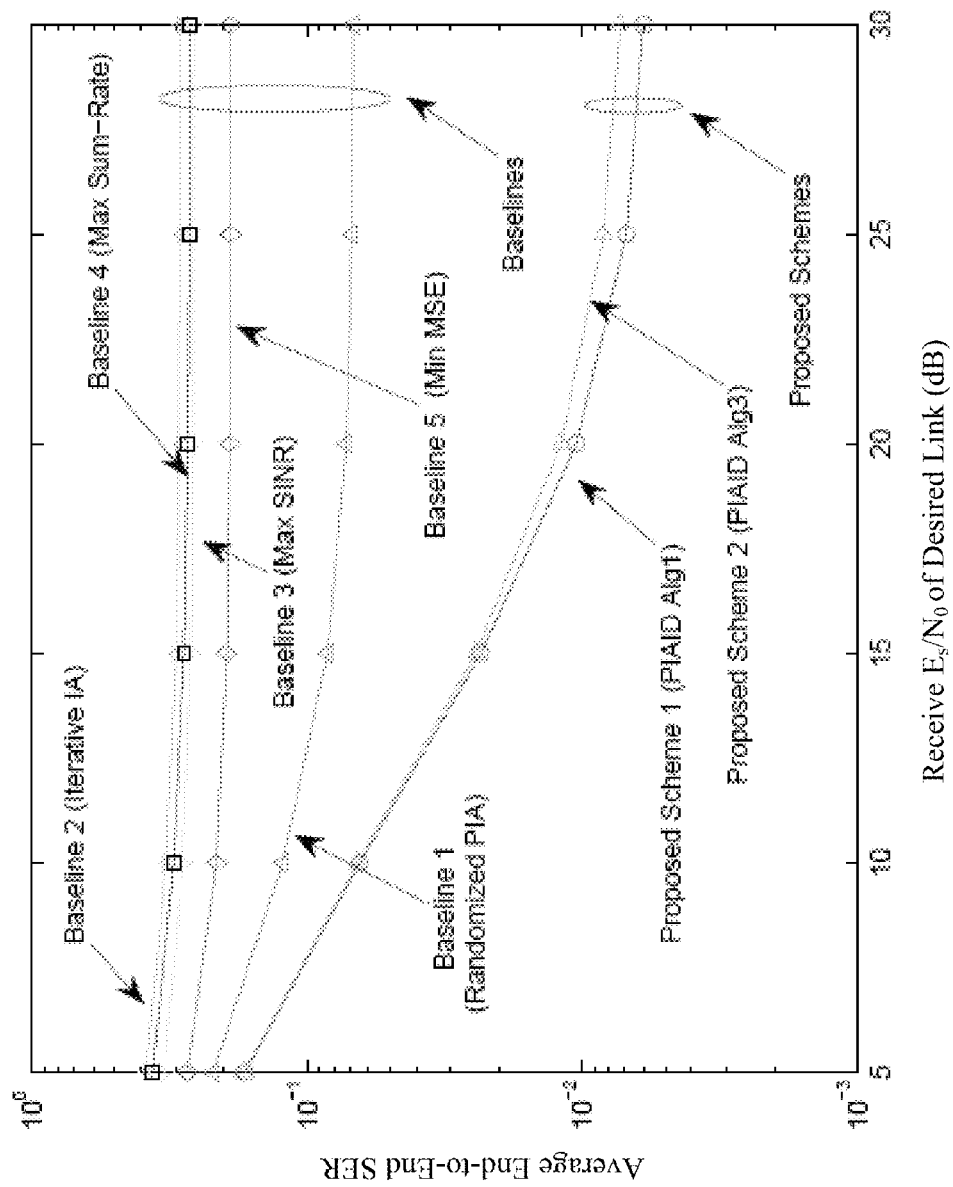
FIG. 15 illustrates the average end-to-end SER performance versus the receive energy per symbol to noise density with 6 users

FIG. 15 illustrates the average end-to-end SER performance versus the receive $E_s/N_0$ (dB). The setup was given by K=6 (number of users), {M=3, N=2} (number of transmit and receive antennas), D=1 (number of data stream), and $\alpha$=3 (number of aligned users for feasible interference alignment). The average SER performance was evaluated with $10^7$ realizations of noise, complex fading coefficients $\{H_{ki}, \forall k,i\}$ and path loss $\{L_{ki}, \forall k,i\}$. As seen in FIG. 14 and FIG. 15, the average SER of all the schemes decreases as the receive $E_s/N_0$ increases, and there is significant performance gain of the proposed schemes compared to all baselines, even for low complexity PIAID with SDR-SID (PS2). The performance gain in PS1 and PS2 is contributed by the user selection of the PIA stage that moves the ID processing out of the unfavorable interference profile as shown in FIG. 5. Furthermore, it can also be observed that PIAID with SDR-SID (PS2) has similar performance as PIAID with Eq. 6 (PS1). Finally, FIG. 14 shows that PS2 has similar performance as the solution obtained by brute-force exhaustive search PS1.

Figure 16:
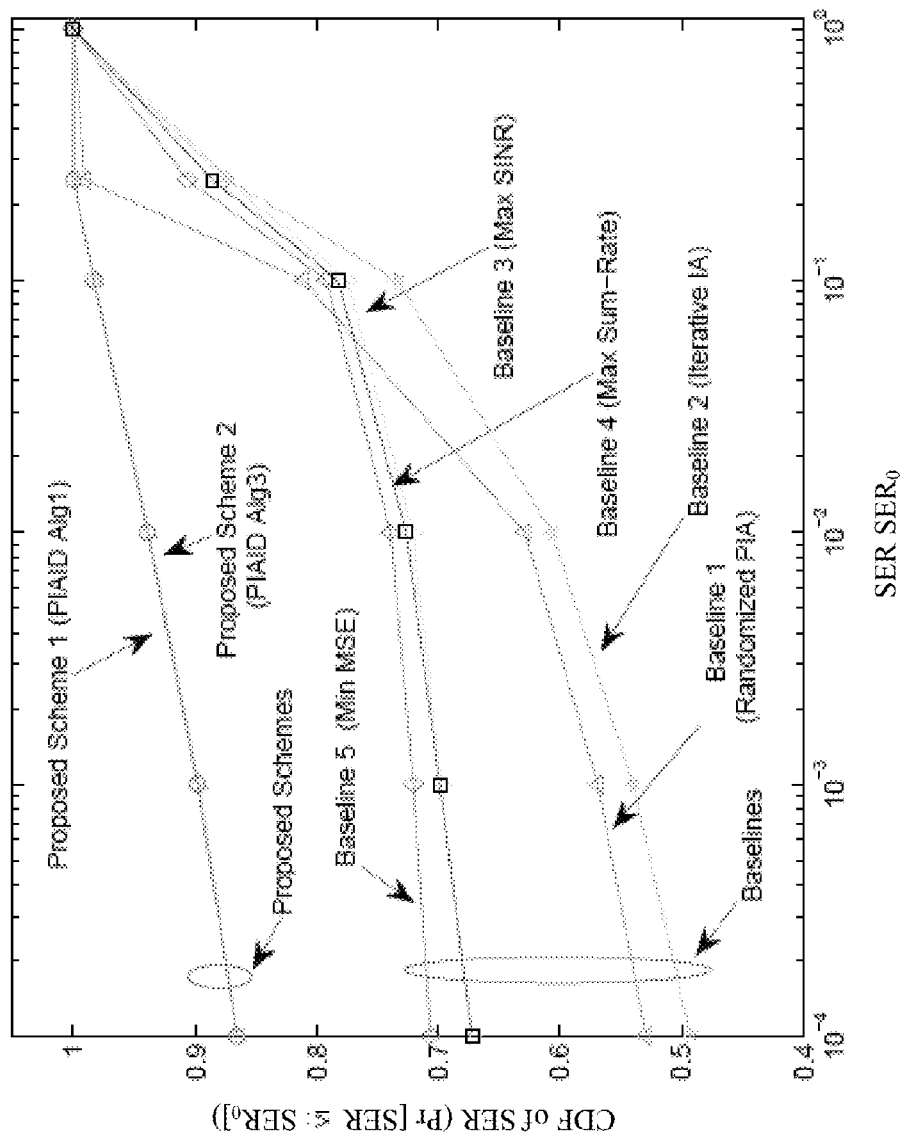
FIG. 16 illustrates the cumulative distribution function (CDF) of the SER per data stream with receive $E_S/N_0$=25 dB with 5 users.

FIG. 16 illustrates the cumulative distribution function (CDF) of the SER per data stream with receive $E_s/N_0=25$ dB. The setup was given by K=5 (number of users), {M=3, N=2} (number of transmit and receive antennas), D=1 (number of data stream), and α=3 (number of aligned users for feasible interference alignment).

Figure 17:
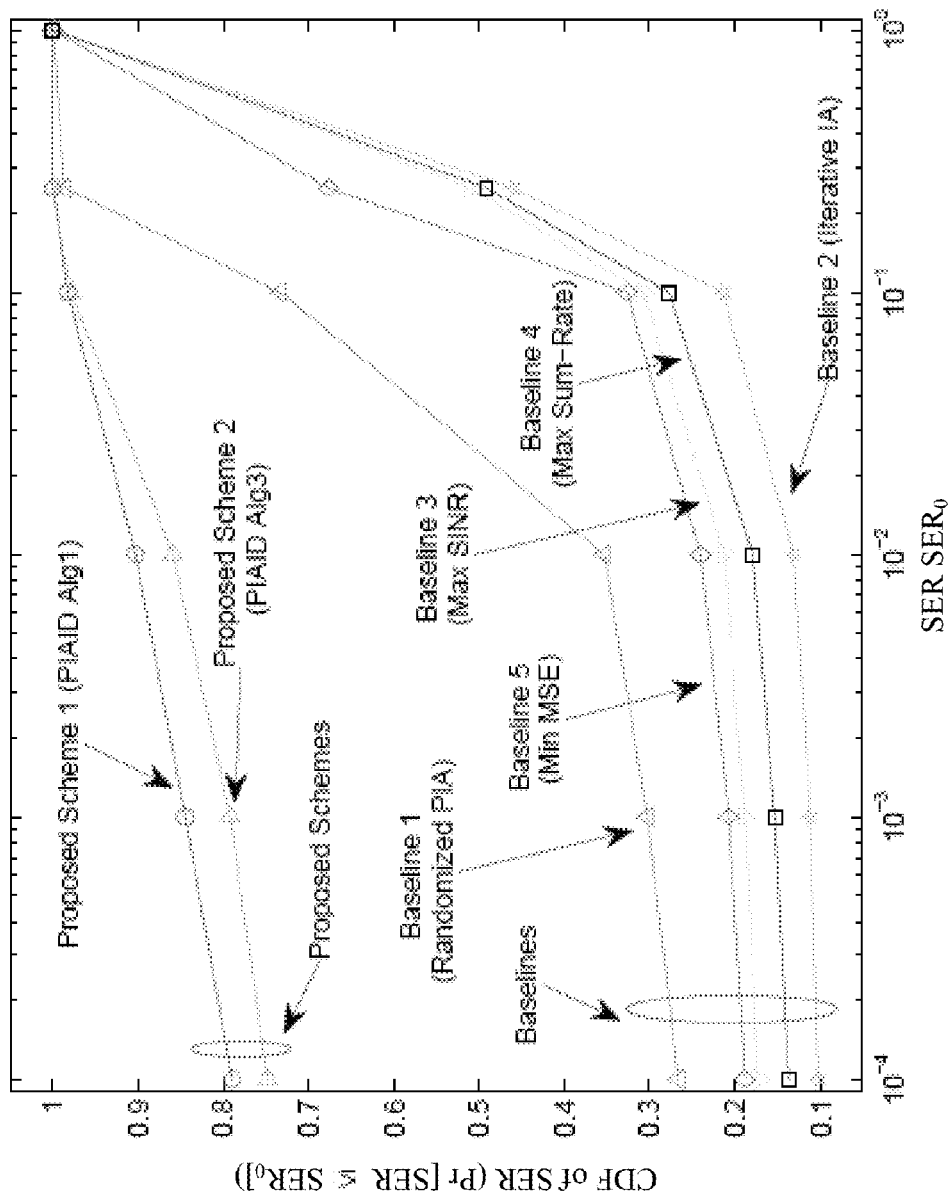
FIG. 17 illustrates the cumulative distribution function (CDF) of the SER per data stream with receive $E_S/N_0$=25 dB with 6 users.

FIG. 17 illustrates the cumulative distribution function (CDF) of the SER per data stream with receive $E_s/N_0=25$ dB. The setup was given by K=6 (number of users), {M=3, N=2} (number of transmit and receive antennas), D=1 (number of data stream), and α=3 (number of aligned users for feasible interference alignment). In FIG. 16 and FIG. 17, the randomness of SER was induced by $\{H_{ki}, \forall k,i\}$ and $\{L_{ki}, \forall k,i\}$. The CDF performance was evaluated with $10^7$ realizations of noise, complex fading coefficients $\{H_{ki}, \forall k,i\}$ and path loss $\{L_{ki}, \forall k,i\}$. As seen in FIG. 16 and FIG. 17, the proposed schemes achieve not only a smaller average SER but also a smaller SER percentile compared with the baselines.

Figure 18:
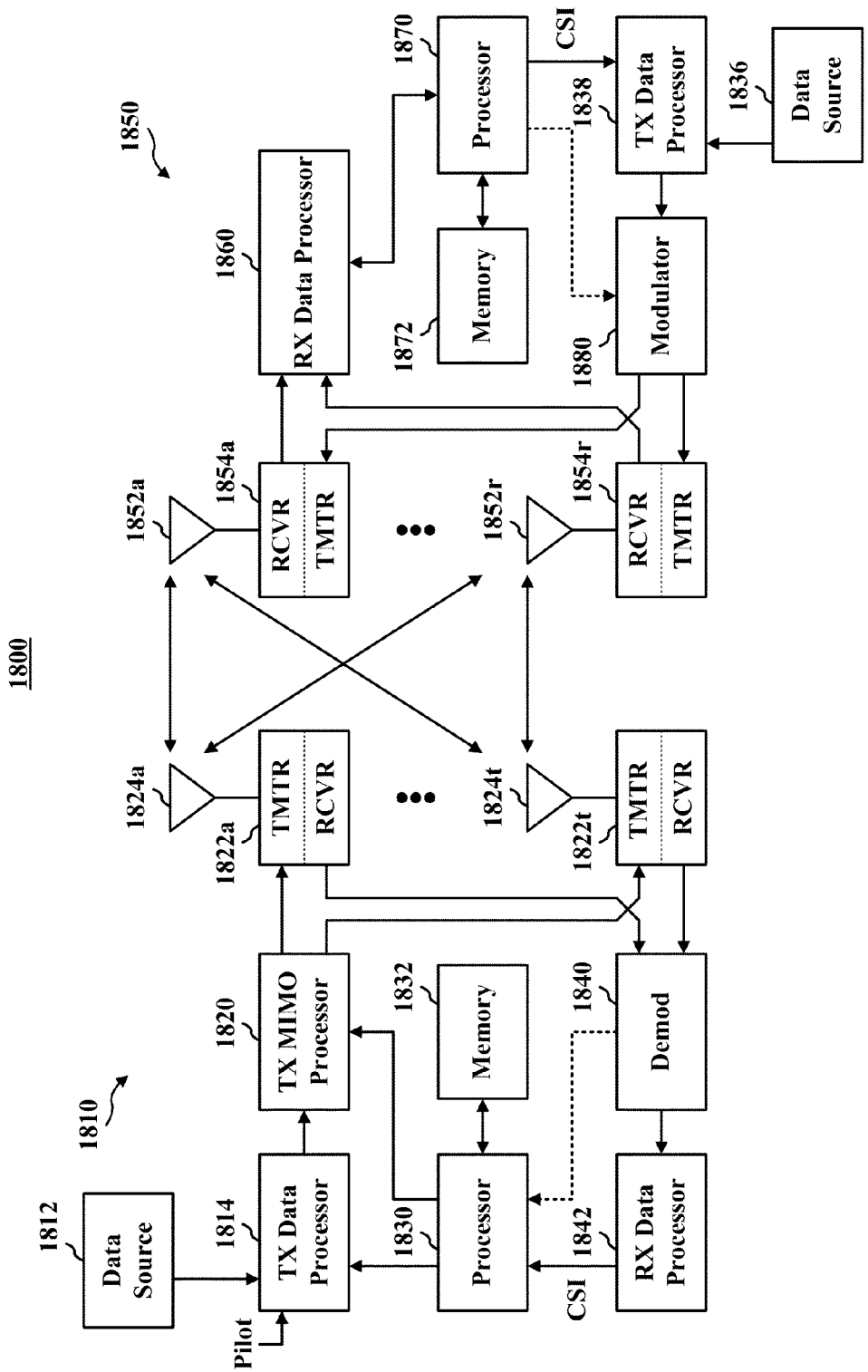
FIG. 18 is an illustration of an exemplary wireless network environment that can be employed in conjunction with the various systems and methods described herein.

Referring now to FIG. 18 a multiple access wireless communication system 1800 according to one or more aspects is illustrated. A wireless communication system 1800 can include one or more base stations in contact with one or more user devices. Each base station provides coverage for a plurality of sectors. A three-sector base station 1802 is illustrated that includes multiple antenna groups, one including antennas 1804 and 1806, another including antennas 18018 and 1810, and a third including antennas 1812 and 1814. According to the figure, only two antennas are shown for each antenna group, however, more or fewer antennas may be utilized for each antenna group. Mobile device 1816 is in communication with antennas 1812 and 1814, where antennas 1812 and 1814 transmit information to mobile device 1816 over forward link 1818 and receive information from mobile device 1816 over reverse link 1820. Forward link (or downlink) refers to communication link from base stations to mobile devices, and reverse link (or uplink) refers to communication link from mobile devices to base stations. Mobile device 1822 is in communication with antennas 1804 and 1806, where antennas 1804 and 1806 transmit information to mobile device 1822 over forward link 1824 and receive information from mobile device 1822 over reverse link 1826. In a FDD system, for example, communication links 1818, 1820, 1824, and 1826 might utilize different frequencies for communication. For example, forward link 1818 might use a different frequency than the frequency utilized by reverse link 1820.

Each group of antennas and/or the area in which they are designated to communicate may be referred to as a sector of base station 1802. In one or more aspects, antenna groups each are designed to communicate to mobile devices in a sector or the areas covered by base station 1802. A base station may be a fixed station used for communicating with mobile devices.

In communication over forward links 1818 and 1824, transmitting antennas of base station 1802 can utilize beamforming in order to improve a signal-to-noise ratio of forward links for different mobile devices 1816 and 1822. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 19:
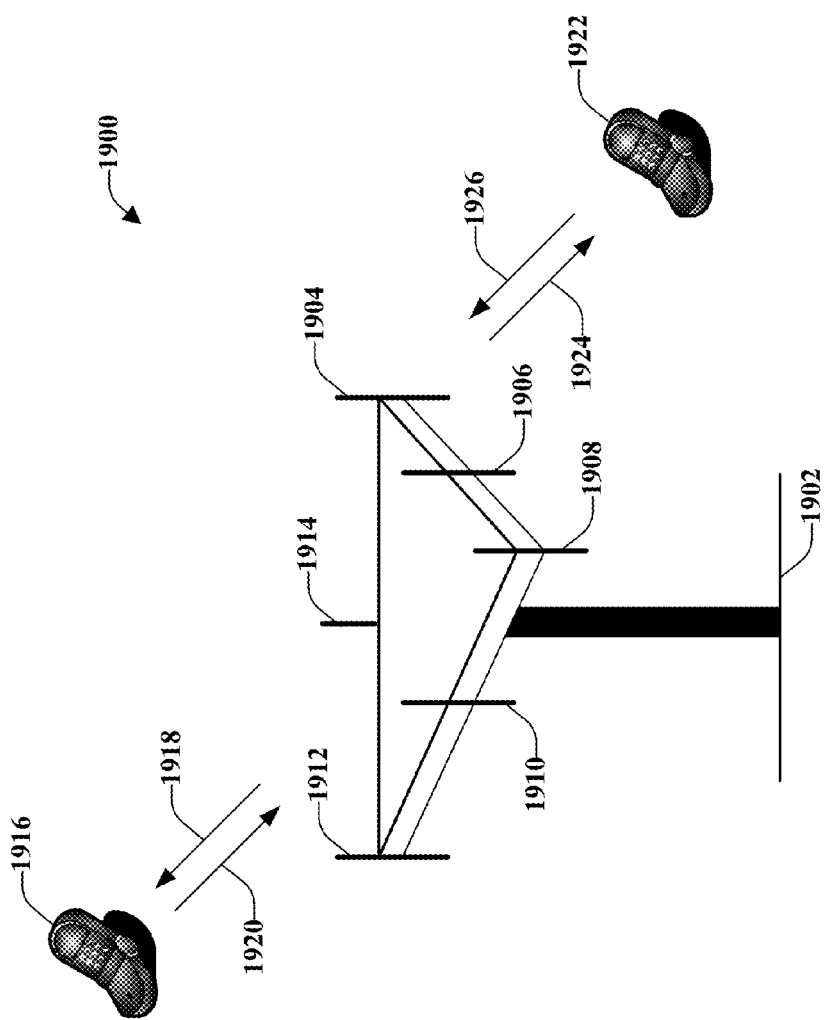
FIG. 19 illustrates a block diagram of an exemplary embodiment of an access point to implement and exploit one or more features or aspects of the disclosed subject matter.

FIG. 19 shows an example wireless communication system 1900. The wireless communication system 1900 depicts one base station 1910 and one access terminal 1950 for sake of brevity. However, it is to be appreciated that system 1900 can include more than one base station and/or more than one access terminal, wherein additional base stations and/or access terminals can be substantially similar or different from example base station 1910 and access terminal 1950 described below. In addition, it is to be appreciated that base station 1910 and/or access terminal 1950 can employ the systems and/or methods described herein to facilitate wireless communication there between.

At base station 1910, traffic data for a number of data streams is provided from a data source 1912 to a transmit (TX) data processor 1914. According to an example, each data stream can be transmitted over a respective antenna. TX data processor 1914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1930.

The modulation symbols for the data streams can be provided to a TX MIMO processor 1920, which can further process the modulation symbols (e.g., for OFDM). TX MIMO processor 1920 then provides $N_T$ modulation symbol streams to $N_T$ transmitters (TMTR) 1922a through 1922t. In various embodiments, TX MIMO processor 1920 applies beamforming weights to the symbols of the data streams and to the antenna from which the symbol is being transmitted.

Each transmitter 1922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1922a through 1922t are transmitted from $N_T$ antennas 1924a through 1924t, respectively.

At access terminal 1950, the transmitted modulated signals are received by $N_R$ antennas 1952a through 1952r and the received signal from each antenna 1952 is provided to a respective receiver (RCVR) 1954a through 1954r. Each receiver 1954 conditions (e.g., filters, amplifies, and down-converts) a respective signal, digitizes the conditioned signal to provide samples, and further processes the samples to provide a corresponding "received" symbol stream.

An RX data processor 1960 can receive and process the $N_R$ received symbol streams from $N_R$ receivers 1954 based on a particular receiver processing technique to provide $N_T$ "detected" symbol streams. RX data processor 1960 can demodulate, deinterleave, and decode each detected symbol stream to recover the traffic data for the data stream. The processing by RX data processor 1960 is complementary to that performed by TX MIMO processor 1920 and TX data processor 1914 at base station 1910.

A processor 1970 can periodically determine which available technology to utilize as discussed above. Further, processor 1970 can formulate a reverse link message comprising a matrix index portion and a rank value portion.

The reverse link message can comprise various types of information regarding the communication link and/or the received data stream. The reverse link message can be processed by a TX data processor 1938, which also receives traffic data for a number of data streams from a data source 1936, modulated by a modulator 1980, conditioned by transmitters 1954a through 1954r, and transmitted back to base station 1910.

At base station 1910, the modulated signals from access terminal 1950 are received by antennas 19194, conditioned by receivers 1922, demodulated by a demodulator 1940, and processed by a RX data processor 19419 to extract the reverse link message transmitted by access terminal 1950. Further, processor 1930 can process the extracted message to determine which precoding matrix to use for determining the beamforming weights.

Processors 1930 and 1970 can direct (e.g., control, coordinate, manage, etc.) operation at base station 1910 and access terminal 1950, respectively. Respective processors 1930 and 1970 can be associated with memory 1932 and 1972 that store program codes and data. Processors 1930 and 1970 can also perform computations to derive frequency and impulse response estimates for the uplink and downlink, respectively.

Figure 20:
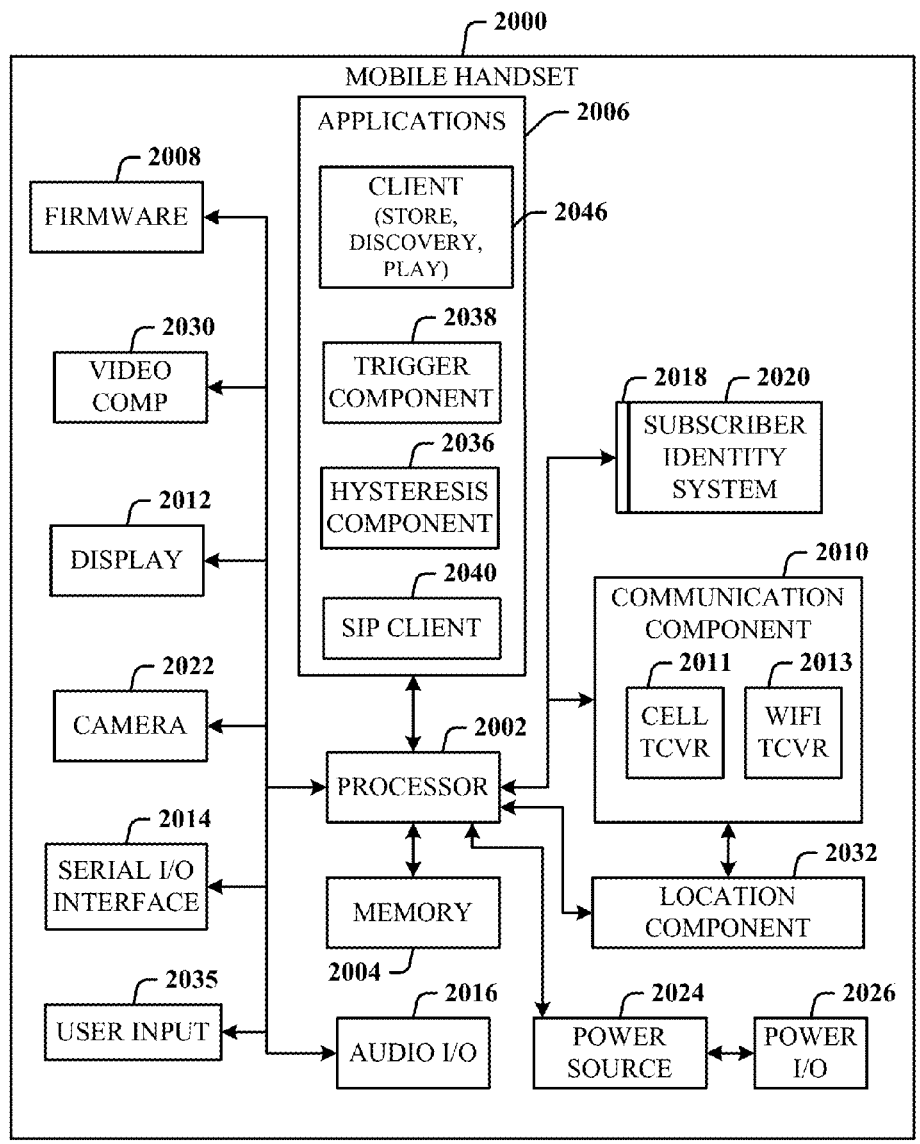
FIG. 20 illustrates an example of a device, a client device in accordance with the embodiments disclosed herein.

FIG. 20 illustrates a schematic block diagram of an exemplary device 2000 capable of employing the subject system in accordance with some embodiments of the invention. The device is a mobile handset 2000 In order to provide additional context for various aspects thereof, FIG. 20 and the following discussion are intended to provide a brief, general description of a suitable environment 2000 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2000 includes a processor 2002 for controlling and processing all onboard operations and functions. A memory 2004 interfaces to the processor 2002 for storage of data and one or more applications 2006 (e.g., a video player software, user feedback component software, . . . ). Other applications can include voice recognition of predetermined voice commands that facilitate initiation of the user feedback signals. The applications 2006 can be stored in the memory 2004 and/or in a firmware 2008, and executed by the processor 2002 from either or both the memory 2004 or/and the firmware 2008. The firmware 2008 can also store startup code for execution in initializing the handset 2000. A communications component 2010 interfaces to the processor 2002 to facilitate wired/wireless communication with external systems, e.g., cellular networks, VoIP networks, and so on. Here, the communications component 2010 can also include a suitable cellular transceiver 2011 (e.g., a GSM transceiver) and an unlicensed transceiver 2013 (e.g., WiFi, WiMax) for corresponding signal communications. The handset 2000 can be a device such as a cellular telephone, a PDA with mobile communications capabilities, and messaging-centric devices. The communications component 2010 also facilitates communications reception from terrestrial radio networks (e.g., broadcast), digital satellite radio networks, and Internet-based radio services networks.

The handset 2000 includes a display 2012 for displaying text, images, video, telephony functions (e.g., a Caller ID function), setup functions, and for user input. The display 2012 can also accommodate the presentation of multimedia content (e.g., music metadata, messages, wallpaper, graphics, . . . ). A serial I/O interface 2014 is provided in communication with the processor 2002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2000, for example. Audio capabilities are provided with an audio I/O component 2016, which can include a speaker for the output of audio signals related to, for example, indication that the user pressed the proper key or key combination to initiate the user feedback signal. The audio I/O component 2016 also facilitates the input of audio signals through a microphone to record data and/or telephony voice data, and for inputting voice signals for telephone conversations.

The handset 2000 can include a slot interface 2018 for accommodating a SIC (Subscriber Identity Component) in the form factor of a card Subscriber Identity Module (SIM) or universal SIM 2020, and interfacing the SIM card 2020 with the processor 2002. However, it is to be appreciated that the SIM card 920 can be manufactured into the handset 2000, and updated by downloading data and software thereinto.

The handset 2000 can process IP data traffic through the communication component 2010 to accommodate IP traffic from an IP network such as, for example, the Internet, a corporate intranet, a home network, a person area network, etc., through an ISP or broadband cable provider. Thus, VoIP traffic can be utilized by the handset 2000 and IP-based multimedia content can be received in either an encoded or decoded format.

A video processing component 2020 (e.g., a camera) can be provided for decoding encoded multimedia content. The handset 2000 also includes a power source 2024 in the form of batteries and/or an AC power subsystem, which power source 2024 can interface to an external power system or charging equipment (not shown) by a power I/O component 2026.

The handset 2000 can also include a video component 2030 for processing video content received and, for recording and transmitting video content. A location tracking component 932 facilitates geographically locating the handset 2000. As described hereinabove, this can occur when the user initiates the feedback signal automatically or manually. A user input component 2034 facilitates the user initiating the quality feedback signal. The input component can include such conventional input device technologies such as a keypad, keyboard, mouse, stylus pen, and touch screen, for example.

Referring again to the applications 2006, a hysteresis component 2036 facilitates the analysis and processing of hysteresis data, which is utilized to determine when to associate with the access point. A software trigger component 2038 can be provided that facilitates triggering of the hysteresis component 2038 when the WiFi transceiver 2013 detects the beacon of the access point. A SIP client 940 enables the handset 2000 to support SIP protocols and register the subscriber with the SIP registrar server. The applications 2006 can also include a client 2042 that provides at least the capability of discovery, play and store of multimedia content, for example, music.

The handset 2000, as indicated above related to the communications component 910, includes an indoor network radio transceiver 2013 (e.g., WiFi transceiver). This function supports the indoor radio link, such as IEEE 802.11, for the dual-mode GSM handset 2000. The handset 2000 can accommodate at least satellite radio services through a handset that can combine wireless voice and digital radio chipsets into a single handheld device.

Figure 21:
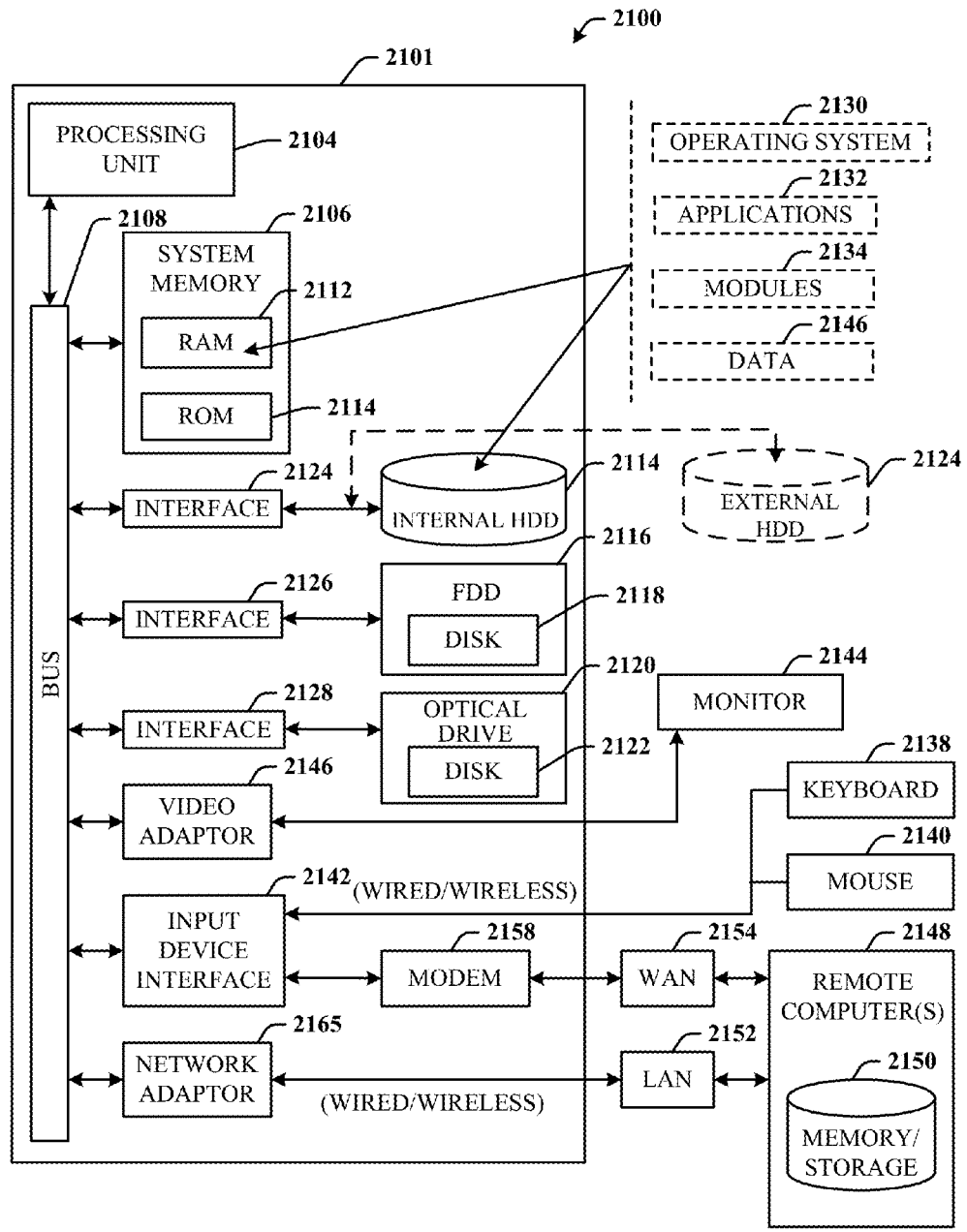
FIG. 21 illustrates a block diagram of a computer operable to execute the disclosed interference adaptation platform and MAC adaptation platform.

Referring now to FIG. 21, there is illustrated a block diagram of a computer operable to provide networking and communication capabilities between a wired or wireless communication network and a server and/or communication device. In order to provide additional context for various aspects thereof, FIG. 21 and the following discussion are intended to provide a brief, general description of a suitable computing environment 2100 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 21, the exemplary environment 2100 for implementing various aspects includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes read-only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 can also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 1022 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. It is to be appreciated that the innovation can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but can be connected by other interfaces, such as a parallel port, an IEEE 2194 serial port, a game port, a USB port, an IR interface, etc.

A monitor 2144 or other type of display device is also connected to the system bus 2108 through an interface, such as a video adapter 2146. In addition to the monitor 2144, a computer typically includes other peripheral output devices (not shown), such as speakers, printers, etc.

The computer 2102 can operate in a networked environment using logical connections by wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which may connect to a global communications network, e.g., the Internet.

When used in a LAN networking environment, the computer 2102 is connected to the local network 2152 through a wired and/or wireless communication network interface or adapter 2156. The adaptor 2156 may facilitate wired or wireless communication to the LAN 2152, which may also include a wireless access point disposed thereon for communicating with the wireless adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wired or wireless device, is connected to the system bus 2108 through the serial port interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2300, etc. UTRA includes Wideband-CDMA (W-CDMA) and other variants of CDMA. Further, CDMA2300 covers IS-2300, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.23, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2300 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the s and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device comprising:
   a memory that stores computer executable components; and
   a processor, coupled to the memory, that executes or facilitates execution of the computer executable components, comprising:
      an identification component configured to identify sets of transmitter and receiver pairs based on feasibility of alignment of the transmitters at the receivers of the sets in accordance with an interference alignment scheme and path loss associated with signal transmissions between the transmitter and receiver pairs, wherein the sets include different alignment assignments of respective transmitters at respective receivers of the sets; and a selection component configured to select a set from the sets that contributes to an interference profile of the receivers that facilitates interference detection by the receivers.

2. The device of claim 1, wherein the alignment assignments include different numbers of the transmitters aligned at the receivers of the sets.

3. The device of claim 1, wherein the selection component is further configured to determine average symbol error rates associated with respective ones of the sets and select the set from the sets that contributes to a smallest asymptotically tight bound for average end-to-end symbol error rate performance at the receivers.

4. The device of claim 1, wherein the interference represents interference at the receivers with a power from about −15.0 dB to about 15.0 dB.

5. The device of claim 1, further comprising:
a partial interference alignment component configured to instruct the transmitter and receiver pairs of the set to perform the interference alignment scheme.

6. The device of claim 5, wherein the partial interference alignment component is further configured to determine precoders for the transmitters of the set and decorrelators for the receivers of the set that facilitate performance of the interference alignment scheme.

7. The device of claim 1, wherein the pairs of transmitters and receivers operate in a quasi-static multiple input multiple output channel.

8. A transmitting device, comprising:
antennas configured to transmit signals in subspaces through a quasi-static multiple input multiple output channel to receiving devices; and
a precoder configured to precode the signals with a beamforming vector to facilitate alignment of interference associated with the transmitting device at a subset of the receiving devices, wherein the subset of the receiving devices is selected from the receiving devices based on a feasibility of the alignment, path loss associated with signal transmissions between the transmitting device and the subset of the receiving devices, and an interference profile of the subset of the receiving devices that facilitates interference detection by the receiving devices.

9. The device of claim 8, wherein the subset of the receiving devices is selected based on interference profiles at the receiving devices that reduce an asymptotically tight bound for average end-to-end symbol error rate performance at the receiving devices, wherein the interference profiles are created in response to performance of the alignment.

10. The device of claim 8, wherein the subset of the receiving devices is selected based on interference profiles at the receiving devices representing interference from about −15.0 dB to about 15.0 dB, wherein the interference profiles are created in response to performance of the alignment.

11. A receiving device, comprising:
antennas configured to receive signals in subspaces through a quasi-static multiple input multiple output channel from transmitting devices, wherein a portion of the signals include interference signals associated with a subset of the transmitting devices; and
a decoder configured to decode the interference signals with a zero-forcing vector associated with an interference alignment scheme to facilitate cancelling interference from the subset of the transmitting devices, wherein the subset of the transmitting devices is selected from the transmitting devices based on feasibility of alignment of the subset of the transmitting devices at the receiving device in accordance with the interference alignment scheme, path loss associated with the signals, and an interference profile of the receiving device that facilitates interference detection by the receiving device.

12. The device of claim 11, wherein the subset of the transmitting devices is determined based on the interference profile of the receiving device that reduces an asymptotically tight bound for average end-to-end symbol error rate performance at the receiving device, wherein the interference profile is created in response to performance of interference alignment scheme.

13. The device of claim 11, wherein the subset of receiving devices is determined based on the interference profile of the receiving device representing interference from about −15.0 dB to about 15.0 dB, wherein the interference profile is created in response to performance of the interference alignment scheme.

14. The device of claim 11, further comprising:
an aggregate interference detection component configured to detect aggregate interference signals; and
a signal detection component configured to subtract the aggregate interference signals from output signals of the zero-forcing vector to detect interference free signals.

15. The device of claim 14, wherein the antennas are further configured to receive the signals encoded with quadrature phase shift keying and the aggregate interference component is configured to detect the aggregate interference signals using constellation maps derived from the signals.

16. The device of claim 14, where the signal detection component is further configured to employ semi-definite relaxation to formulate a detection process having polynomial complexity and employ the detection process to detect the interference free signals.

17. A method, comprising:
determining sets of transmitter and receiver pairs based on feasibility of alignment of the transmitters at the receivers of the sets in accordance with an interference alignment scheme and path loss associated with signal transmissions between the transmitter and receiver pairs, wherein the sets include different alignment assignments of the respective transmitters at the respective receivers of the sets; and
selecting a set from the sets that contributes to an interference profile of the receivers that facilitates interference detection by the receivers.

18. The method of claim 17, wherein the alignment assignments include different numbers of the transmitters aligned at the receivers of the sets.

19. The method of claim 17, wherein the selecting the set comprises determining average symbol error rates associated with respective ones of the sets and selecting the set from the sets that contributes to a smallest asymptotically tight bound for average end-to-end symbol error rate performance at the receivers.

20. The method of claim 17, wherein the interference represents interference at the receivers with a power from about −15.0 dB to about 15.0 dB.

21. The method of claim 17, further comprising:
instructing the transmitter and receiver pairs of the set to perform the interference alignment scheme.

22. The method of claim 21, wherein the instructing further comprises determining precoders for the transmitters of the set and decorrelators for the receivers of the set that facilitate performance of the interference alignment scheme.

23. The method of claim 17, wherein the pairs of transmitters and receivers operate in a quasi-static multiple input multiple output channel.

24. A method comprising:
   transmitting signals from a transmitting device in subspaces through a quasi-static multiple input multiple output channel to receiving devices;
   selecting a subset of the receiving devices based on a feasibility of the alignment of interference associated with the transmitting device at the subset of the receiving devices, path loss information associated with signal transmissions between the transmitting device and the subset of receiving devices, and interference profiles of the subset of the receiving devices that facilitate interference detection by the receiving devices; and
   precoding the signals with a beamforming vector that facilitates the alignment of interference associated with the transmitting device at the subset of the receiving devices.

25. The method of claim 24, wherein the selecting the subset of the receiving devices comprises selecting the subset of the receiving devices based on interference profiles of the receiving devices that reduce an asymptotically tight bound for average end-to-end symbol error rate performance at the receiving devices, and wherein the interference profiles are created in response to performing the alignment.

26. The method of claim 24, wherein the selecting the subset of the receiving devices comprises selecting the subset of the receiving devices based on interference profiles of the receiving devices representing interference from about −15.0 dB to about 15.0 dB, and wherein the interference profiles are created in response to performing the alignment.

27. A method comprising:
   receiving signals at a receiving device in subspaces through a quasi-static multiple input multiple output channel from transmitting devices;
   receiving aligned signals at the receiving device from a subset of the transmitting devices in accordance with an interference alignment scheme;
   selecting the subset of the transmitting devices based on a feasibility of the interference alignment scheme, path loss information associated with received signals, and an interference profile of the receiving device that facilitates interference detection by the receiving device; and
   decoding the aligned signals with a zero-forcing vector that facilitates cancelling interference associated with the subset of the transmitting devices.

28. The method of claim 27, wherein the selecting the subset of the transmitting devices comprises determining the subset of the transmitting devices based on the interference profile of the receiving device that reduces an asymptotically tight bound for average end-to-end symbol error rate performance at the receiving device, wherein the interference profile is created in response to performance of the interference alignment scheme.

29. The method of claim 27, wherein the selecting the subset of transmitting devices comprises determining the subset of the transmitting devices based on the interference profile of the receiving devices comprising interference from about −15.0 dB to about 15.0 dB, and wherein the interference profile is created in response to performance of the interference alignment scheme.

30. The method of claim 27, further comprising:
   detecting aggregate interference signals included in the signals, wherein the received signals are encoded with quadrature phase shift keying;
   subtracting the aggregate interference signals from output signals of the zero-forcing vector; and
   identifying interference free signals.

31. The method of claim 30, wherein the detecting the aggregate interference signals includes employing constellation maps derived from the signals.

32. The method of claim 30, wherein the identifying the interference free signals comprises employing semi-definite relaxation to formulate a detection algorithm having has polynomial complexity and employing the detection algorithm to identify the interference free signals.

33. A non-transitory computer readable storage medium comprising computer executable instructions that, in response to execution, cause a computing system to perform operations, comprising:
   determining sets of transmitter and receiver pairs based on feasibility of alignment of the transmitters at the receivers of the sets in accordance with an interference alignment scheme and path loss associated with signal transmissions between the transmitter and receiver pairs, wherein the sets include different alignment assignments of respective transmitters at respective receivers of the sets; and
   selecting a set from the sets that contributes to an interference profile of the receivers that facilitates interference detection by the receivers.

34. The non-transitory computer readable storage medium of claim 33, wherein the alignment assignments include different numbers of the transmitters aligned at the receivers of the sets.

35. The non-transitory computer readable storage medium of claim 33, wherein the selecting the set comprises determining average symbol error rates associated with respective ones of the sets and selecting the set from the sets that contributes to the smallest asymptotically tight bound for average end-to-end symbol error rate performance at the receivers.

36. The non-transitory computer readable storage medium of claim 33, wherein the interference represents interference at the receivers with a power from about −15.0 dB to about 15.0 dB.

37. The non-transitory computer readable storage medium of claim 33, the operations further comprising:
   instructing the transmitter and receiver pairs of the set to perform the interference alignment scheme.

38. The non-transitory computer readable storage medium of claim 37, wherein the instructing further comprises determining precoders for the transmitters of the set and decorrelators for the receivers of the set that facilitate performance of the interference alignment scheme.

39. The non-transitory computer readable storage medium of claim 33, wherein the pairs of transmitters and receivers operate in a quasi-static multiple input multiple output channel.

* * * * *